US008664324B2

(12) United States Patent
Tanabe et al.

(10) Patent No.: US 8,664,324 B2
(45) Date of Patent: Mar. 4, 2014

(54) PIGMENT DISPERSANTS WITH MODIFIED COPOLYMERS

(75) Inventors: Junichi Tanabe, Amagasaki (JP); Mamiko Takesue, Osaka (JP)

(73) Assignee: BASF SE, Ludwigshafen (DE)

( * ) Notice: Subject to any disclaimer, the term of this patent is extended or adjusted under 35 U.S.C. 154(b) by 451 days.

(21) Appl. No.: 12/999,678

(22) PCT Filed: Jun. 10, 2009

(86) PCT No.: PCT/EP2009/057187
§ 371 (c)(1),
(2), (4) Date: Jan. 28, 2011

(87) PCT Pub. No.: WO2009/156277
PCT Pub. Date: Dec. 30, 2009

(65) Prior Publication Data
US 2011/0144260 A1    Jun. 16, 2011

(30) Foreign Application Priority Data

Jun. 23, 2008 (EP) .................................... 08158738

(51) Int. Cl.
*C09D 153/00* (2006.01)
*C08F 283/01* (2006.01)

(52) U.S. Cl.
USPC ........... 524/505; 525/294; 525/291; 525/288; 525/292; 525/280; 524/555; 524/547; 524/548

(58) Field of Classification Search
USPC .......... 524/505, 555, 547, 548; 525/294, 291, 525/288, 292, 280, 299
See application file for complete search history.

(56) References Cited

U.S. PATENT DOCUMENTS

| | | | | |
|---|---|---|---|---|
| 6,281,311 B1* | 8/2001 | Lai et al. | ........................ | 526/220 |
| 7,691,797 B2* | 4/2010 | Schmidt et al. | ............... | 508/469 |
| 2003/0105201 A1 | 6/2003 | Auschra et al. | | |
| 2004/0143032 A1 | 7/2004 | Auschra | | |
| 2005/0004317 A1 | 1/2005 | Auschra | | |
| 2009/0186285 A1 | 7/2009 | Schellenberg | | |
| 2009/0221739 A1 | 9/2009 | Knischka et al. | | |

FOREIGN PATENT DOCUMENTS

| | | |
|---|---|---|
| EP | 0329873 A | 8/1989 |
| EP | 1275689 A1 | 1/2003 |
| WO | 00/40630 A | 7/2000 |
| WO | 03/046029 A | 6/2003 |
| WO | 2006/074969 A1 | 7/2006 |

OTHER PUBLICATIONS

Nicolas et al., Living Character of Polymer Chains Prepared via Nitroxide-Mediated Controlled Free-Radical Polymerization of Methyl Methacrylate in the Presence of a Small Amount of Styrene at Low Temperature, Macromolecules 2006, 39, 8274-8282.*
I.V. Berlinova et al., Polymer, vol. 41, Feb. 2000, pp. 831-837.
Wen-Fu Lee et al., Polymer, vol. 38, No. 4, Feb. 1997, pp. 971-979.
Lee et al., Journal of Applied Polymer Science, vol. 80, Jun. 16, 2001, pp. 1619-1626.
Andrew Lowe et al., Macromolecules, vol. 32, Apr. 6, 1999, pp. 2141-2148.

\* cited by examiner

*Primary Examiner* — Robert D. Harlan
(74) *Attorney, Agent, or Firm* — Shruti Costales

(57) ABSTRACT

The present invention pertains to salt modified copolymers wherein one of the monomer units contains a quaternized N-atom structure with a polar substituent. The invention further relates to the use of said copolymers as dispersant especially for color filters. The copolymer is made by controlled polymerization or by conventional polymerization and comprises at least one monomer ($MA_r$) selected from unsaturated monomers out of the group of acrylates, methacrylates, acrylamides, methacrylamides, styrenic monomers, at least one monomer ($MB_s$) selected from unsaturated monomers out of the group of acrylates, methacrylates, acrylamides, methacrylamides, styrenic monomers wherein the monomer MB has a quaternized N-atom structure with a polar substituent selected from polyether, polyamine, nitrile, amide, imine, imide, ester, ketone, nitrile, aldehyde, diketone, ketoester, ketoamide, carbonate, carbamate, carbamide, sulfoxide, sulfone, carboxylic acid, sulfonic acid, phosphoric acid groups; or carboxylic acid anion, sulfonic acid anion or phosphoric acid anion groups which is formed as betaine structure r denotes the total number of monomers MA within the structural element ($MA_r$) and r is >5, preferred 10-1000, most preferred 10-500; s denotes the total number of monomers MB within the structural element ($MB_s$) and s is >1, preferred 2-100, most preferred 2-50.

20 Claims, No Drawings

PIGMENT DISPERSANTS WITH MODIFIED COPOLYMERS

The present invention pertains to salt modified copolymers wherein one of the monomer units contains a quaternized N-atom structure with a polar substituent. The invention further relates to the use of said copolymers as dispersant especially for color filters.

In color filter application particle size of pigment is getting smaller and smaller to have better color property, and also photolithographic process becomes very important for higher throughput and CF production stability. However such a small pigment makes dispersing more difficult and photolithographic process, especially resist development property is still not optimum.

Therefore there is a strong need for dispersant to improve dispersibility and development property.

The European Patent publication EP1275689 (Ciba) describes block copolymers of the formula X-Ax-By-Y wherein X and Y represent chain terminal groups from fragments of a polymerisation initiator and A and B represent different polymer blocks composed of non-ionic repeating units of ethylenically unsaturated monomers, additionally contains repeating units of ethylenically unsaturated monomers substituted with ionic groups. Disclosed are for example polymers of n-butyl acrylate and 2-dimethylaminoethyl acrylate (DMAEA) or n-butyl acrylate and 4-vinylpyridine, wherein the amino or the pyridine group is quaternized and a salt is formed.

The International Publication WO0040630 (Ciba) relates to a composition containing ATRP polymers and dispersible inorganic or organic pigment particles. Examples are given for copolymers like poly(BA-b-DMAEA) quatenized with benzyl chloride or with para toluene sulfonic acid. Quaternized N-atom structures having a polar substituent are not disclosed.

The International Publication WO03046029 (Ciba) relates to a composition containing modified block copolymer dispersants and dispersible inorganic or organic pigments. The block copolymers are prepared by atom transfer radical polymerisation (ATRP) and modified with a salt forming group. The salt forming groups are specific monocyclic sulphonic acids or polycyclic sulphonic acids or mono- or polycyclic carboxylic and phosphonic acids. Quaternized N-atom structures having a polar substituent are not disclosed.

The European Patent Publication EP0329873 (DuPont) discloses block copolymers composed of acrylate or methacrylate monomers which exhibit substantially different polarity, one of the blocks having cationic ammonium, phosphonium or sulfonium moieties. Disclosed is, for example, a methyl methacrylate-dimethylaminoethylmethacrylate (DMAEMA)-co-polymer quaternized with benzylchloride.

The Japanese publication JP2002031713 (Mitsubishi) provides a color filter containing a binder resin and/or a compound having a polymerizable group, provided with an acidic group (1), a pigment (2) and a dispersing agent (3). The dispersing agent is an A-B block co-polymer consisting of an A block with a quaternary ammonium salt in a side chain and a B block with no quaternary ammonium base and/or a B-A-B block copolymer.

The US Publication U.S. Pat. No. 6,100,312 (Fuji) discloses a radiation sensitive colored composition comprising (A) a copolymer which comprises a quaternary ammonium salt monomer; (B) a radiation sensitive compound; and (C) a pigment: which can provide a color filter having excellent pattern reproducibility because of its high suitability for dispersion of fine-grain pigment and its high storage stability. Any monomer can be used as a quaternary ammonium salt monomer. Specific examples of such a monomer include:

methacryloyloxyethyltrimethylammonium p-toluenesulfonate,
methacryloyloxyethyltrimethylammonium chloride,
methacryloyloxyethyldimethylethylammonium p-toluenesulfonate,
methacryloyloxyethyldimethylisoproylammonium p-toluenesulfonate,
acryloyloxyethyltrimethylammonium p-toluenesulfonate,
dimethyloctadecylvinylbenzylammonium chloride,
2-vinyl-N-methylpyridinium methylsulfate,
N-methyl-N-methacryloyloxyethylpiperidinium bromide and
N-methacryloyloxyethylpiperidinium nitrate.

The above prior art publications comprise mainly a salt structure with conventional aliphatic and aromatic hydrocarbon on the amino group.

Surprisingly, we recently found that using a copolymer having monomer units containing a quaternized N-atom structure with a polar substituent, results in novel salt modified dispersants which show better dispersing performance and development properties compared with the conventional salt formed dispersant in color filter application.

Thus, the invention relates to a copolymer made by controlled polymerisation or by conventional polymerization comprising
at least one monomer ($MA_r$) selected from unsaturated monomers out of the group of acrylates, methacrylates, acrylamides, methacrylamides, styrenic monomers, at least one monomer ($MB_s$) selected from unsaturated monomers out of the group of acrylates, methacrylates, acrylamides, methacrylamides, styrenic monomers wherein the monomer MB has a quaternized N-atom structure with a polar substituent selected from polyether, polyamine, nitrile, amide, imine, imide, ester, ketone, nitrile, aldehyde, diketone, ketoester, ketoamide, carbonate, carbamate, carbamide, sulfoxide, sulfone, carboxylic acid, sulfonic acid, phosphoric acid groups; or carboxylic acid anion, sulfonic acid anion or phosphoric acid anion groups which is formed as betaine structure
r denotes the total number of monomers MA within the structural element ($MA_r$) and r is >5, preferred 10-1000, most preferred 10-500;
s denotes the total number of monomers MB within the structural element ($MB_s$) and s is >1, preferred 2-100, most preferred 2-50.

In one embodiment the polymer is obtained by conventional polymerisation by reacting monomer MA with monomer MB in the presence of a free radical initiator selected from inorganic and organic peroxides, hydroperoxides, persulfates, azo compounds such as azobisisobutyronitrile (AIBN) and the like.

In one embodiment the polymer is produced by controlled polymerisation.

Examples of controlled polymerizations are:
Group transfer polymerisation (GTP) as described, for example, in U.S. Pat. No. 4,656,226.
The reversible addition-fragmentation chain transfer polymerisation RAFT using chain transfer agents which react by reversible addition-fragmentation chain transfer as described, for example, in WO-A-98/01478, WO-A-99/05099 or WO-A-99/31144.
Atom transfer radical polymerisation (ATRP) as, for example, described in WO96/30421.
Polymerization in the presence of alkoxyamine initiator/regulator compounds as described, for example, in U.S. Pat. No. 4,581,429 or EP-A-0 621 878 or polymerization in the presence of a stable nitroxyl free radical and a radical initiator (source of free radicals) as described, for example, in WO-A-94/11412 (nitroxide mediated controlled polymerisation).

RAFT describes a method of polymer synthesis by radical polymerization in the presence of a free radical source and using chain transfer agents which react by reversible addition-fragmentation chain transfer. The chain transfer agent is, for example, 2-phenylprop-2-yl dithiobenzoate (Ph-C(CH$_3$,CH$_3$)—S—C(S)-Ph) or benzyl dithioacetate Ph-CH$_2$—S—C(S)—CH$_3$ as described in WO-A-98/01478, or a carbamates such as, for example, benzyl 1-pyrrolecarbodithioate

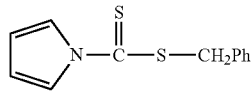

as described in WO99/31144; or alkylxanthates such as, for example, ethyl α(O-ethylxanthyl propionate) as described in WO 98/58974

WO 96/30421 (K. Matyjaszewski) discloses a controlled polymerisation process of ethylenically unsaturated polymers, such as styrene or (meth)acrylates, by employing the Atomic Transfer Radical Polymerisation (ATRP) method. This method produces defined homopolymers and copolymers, including block copolymers. Initiators are employed, which generate radical atoms, such as .Cl, in the presence of a redox system of transition metals of different oxidation states, e.g. Cu(I) and Cu(II), providing "living" or controlled radical polymerisation.

DEFINITIONS

The monomer MA is selected from unsaturated monomers out of the group of acrylates, methacrylates, acrylamides, methacrylamides, styrenic monomers.

The copolymer MA-MB build up of monomers MA and monomers MB may include different kinds of monomers MA and different kinds of monomers MB. The term "selected from" means selected from one of the monomers listed or selected from more than one of the monomers listed.

The Monomer MA is not a salt.

Monomers MA are selected from CH$_2$=CH—C(O)OR$_2$, CH$_2$=C(CH$_3$)—C(O)OR$_2$, CH$_2$=C(R$_1$)—C(O)OR$_2$CH$_2$=CH—C(O)NR$_4$R$_5$, CH$_2$=C(CH$_3$)—C(O)NR$_4$R$_5$CH$_2$=C(R$_1$)—C(O)NR$_4$R$_5$ or CH$_2$=C(R$_{10}$)—Ar, wherein R$_1$ is halogen or cyano or R$_1$ is C$_1$-C$_{18}$alkyl, C$_2$-C$_{18}$alkenyl, C$_3$-C$_{18}$cycloalkyl, C$_4$-C$_{18}$cycloalkenyl, C$_6$-C$_{24}$aryl, C$_1$-C$_{12}$alkyl-C$_6$-C$_{24}$aryl or C$_2$-C$_{12}$alkenyl-C$_6$-C$_{24}$aryl each of which optionally is substituted by one or more halogen or OR$_3$, SR$_3$ or NR$_4$R$_5$; and/or optionally is interrupted by one or more —O—, —S—, —NR$_4$—, R$_2$ is hydrogen; or R$_2$ is C$_1$-C$_{40}$alkyl, C$_2$-C$_{40}$alkenyl, C$_3$-C$_{40}$cycloalkyl, C$_4$-C$_{40}$cycloalkenyl, C$_6$-C$_{24}$aryl, C$_1$-C$_{20}$alkyl-C$_6$-C$_{24}$aryl or C$_2$-C$_{20}$alkenyl-C$_6$-C$_{24}$aryl each of which optionally is substituted by one or more halogen, OR$_3$, SR$_3$, NR$_4$R$_5$, NH—CO—OR$_{20}$ with R$_{20}$ is —C$_2$-C$_6$alkylene-NR$_4$R$_5$ or is a polyester residue and/or optionally is interrupted by one or more —O—, —S—, —NR$_4$—, —C(O)—, —C(O)O—, —C(O)NR$_4$— or —OC(O)NR$_4$—

R$_3$ is hydrogen; or R$_3$ is C$_1$-C$_{20}$alkyl, C$_2$-C$_{20}$alkenyl, C$_3$-C$_{20}$cycloalkyl, C$_4$-C$_{20}$cycloalkenyl, C$_6$-C$_{24}$aryl, C$_1$-C$_{20}$alkyl-C$_6$-C$_{24}$aryl or C$_2$-C$_{20}$alkenyl-C$_6$-C$_{24}$ aryl each of which optionally is substituted by one or more halogen, OC$_1$-C$_{12}$alkyl, SC$_1$-C$_{12}$alkyl or NR$_4$R$_5$; and/or each of which is optionally interrupted by one or more —O—, —C(O)—, —C(O)O—, —S—, —NR$_4$—, R$_4$, R$_5$ independently of each other are hydrogen; or R$_4$, R$_5$ independently of each other are C$_1$-C$_{20}$alkyl, C$_2$-C$_{20}$alkenyl, C$_3$-C$_{20}$cycloalkyl, C$_4$-C$_{20}$cycloalkenyl, C$_6$-C$_{18}$aryl, C$_1$-C$_{20}$alkyl-C$_6$-C$_{24}$aryl or C$_2$-C$_{20}$alkenyl-C$_6$-C$_{24}$aryl each of which optionally is substituted by one or more halogen, OR$_3$, SR$_3$, C(O)R$_3$, N(C$_1$-C$_{12}$alkyl)$_2$; and/or optionally is interrupted by one or more —O—, —S—, —C(O)— or —NC$_1$-C$_{12}$alkyl; R$_4$ and R$_5$ can optionally form 5-, 6- or 7-membered rings with each other;

R$_{10}$ is hydrogen, halogen or cyano; or R$_{10}$ is C$_1$-C$_{18}$alkyl, C$_2$-C$_{18}$alkenyl, C$_3$-C$_{18}$cycloalkyl, C$_4$-C$_{18}$cycloalkenyl, C$_6$-C$_{24}$aryl, C$_1$-C$_{12}$alkyl-C$_6$-C$_{24}$aryl or C$_2$-C$_{12}$alkenyl-C$_6$-C$_{24}$aryl each of which optionally is substituted by one or more halogen or OR$_3$, SR$_3$ or NR$_4$R$_5$; and/or optionally is interrupted by one or more —O—, —S—, —NR$_4$—, Ar is pyridyl or imidazolyl, or C$_6$-C$_{24}$aryl which optionally is substituted by one or more halogen, C$_1$-C$_{20}$alkyl, C$_2$-C$_{20}$alkenyl, OR$_3$, SR$_3$, NR$_4$R$_5$, C(O)R$_3$, C(O)OR$_3$, C(O)SR$_3$ or C(O)NR$_4$R$_5$.

At least one monomer (MA$_r$) means that also two or more monomers MA may be present in the copolymer. Preferred are one or two monomers MA.

Preferred Monomers MA

Preferred are CH$_2$=CH—C(O)OR$_2$, CH$_2$=C(CH$_3$)—C(O)OR$_2$, CH$_2$=CH—C(O)NR$_4$R$_5$, CH$_2$=C(CH$_3$)—C(O)NR$_4$R$_5$ or CH$_2$=CH—Ar wherein R$_2$, R$_4$, R$_5$ and Ar are as defined above.

R$_2$ is preferably linear or branched C$_1$-C$_{40}$alkyl, or C$_1$-C$_{40}$alkyl substituted by one or more halogen, OH, —N(C$_1$-C$_{20}$alkyl)$_2$, —NH—CO—O—C$_2$-C$_6$alkylene-N(C$_1$-C$_{20}$alkyl)$_2$, —NH—CO—O—C$_1$-C$_{40}$alkylene interrupted by one or more —O—.

Ar is preferably phenyl, tolueneyl, pyridyl, imidazolyl.

Examples of preferred monomers MA are:

styrene, p-vinyltoluene, vinylpyridine, vinylimidazole;

methylacrylate, ethylacrylate, butylacrylate, isobutylacrylate, tert-butylacrylate, hydroxyethylacrylate, hydroxypropylacrylate, dimethylaminoethylacrylate, ethylhexylacrylate, benzylacrylate, polyethyleneglycolmonomethyletheracrylate, cyclohexylacrylate, acrylic acid, methyl(meth)acrylate, ethyl(meth)acrylate, butyl(meth)acrylate, isobutyl(meth)acrylate, tertbutyl(meth)acrylate, hydroxyethyl(meth)acrylate, hydroxypropyl(meth)acrylate, dimethylaminoethyl(meth)acrylate, ethylhexyl(meth)acrylate, benzyl(meth)acrylate, polyethyleneglycolmonomethylether(meth)acrylate, cyclohexyl(meth)acrylate, (meth)acrylic acid,

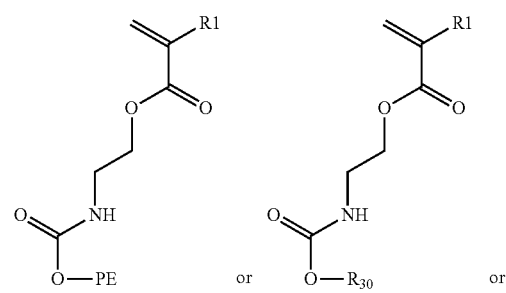

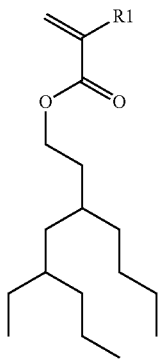

wherein $R_1$ is hydrogen or methyl and

PE is $C_{10}$-$C_{40}$alkyl or $C_{10}$-$C_{40}$alkenyl each of which is interrupted by one or more —O— or —C(O)O—;

$R_{30}$ is —$C_2$-$C_6$alkylene-N($C_1$-$C_2$alkyl)$_2$ or is a polyester residue derived from a caprolactone. $R_{30}$ is for example

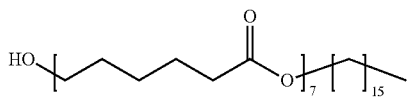

Examples of especially preferred monomers MA are:

styrene, vinylpyridine, butylacrylate, hydroxyethylacrylate, ethylhexylacrylate, polyethyleneglycolmonomethyletheracrylate, dimethylaminoethylacrylate, methyl(meth)acrylate, dimethylaminoethyl(meth)acrylate, hydroxyethyl(meth)acrylate, polyethyleneglycolmonomethylether(meth)acrylate,

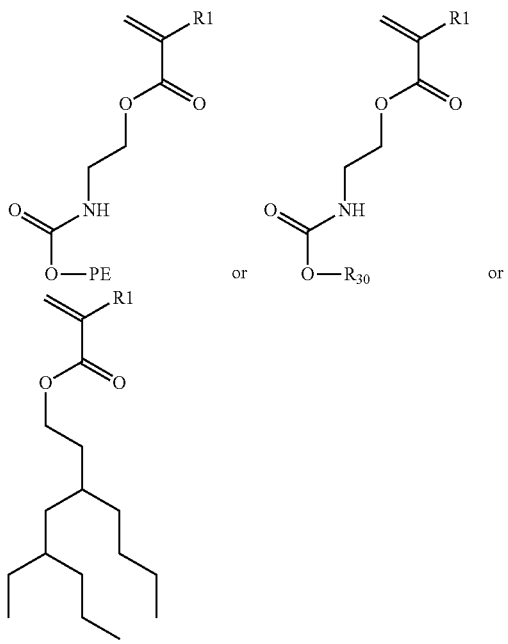

wherein $R_1$ is hydrogen or methyl and

PE is $C_{10}$-$C_{40}$alkyl interrupted by one or more —O— or —C(O)O—;

$R_{30}$ is —$C_2$-$C_4$alkylene-N($C_1$-$C_2$alkyl)$_2$ or is

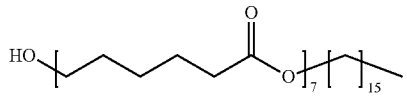

Most preferred monomers MA are those as being named in the examples:

vinylpyridine, butylacrylate, dimethylaminoethylmethacrylate

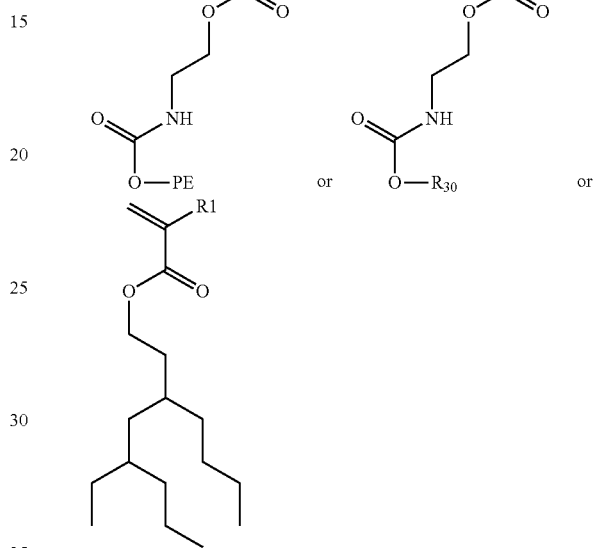

wherein $R_1$ is hydrogen or methyl and

PE is $C_{10}$-$C_{40}$alkyl interrupted by one or more —O— or —C(O)O—;

$R_{30}$ is —$C_2$-$C_4$alkylene-N($C_1$-$C_2$alkyl)$_2$ or is

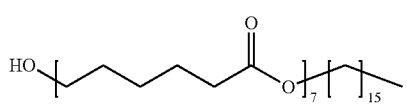

The monomer MB is selected from unsaturated monomers out of the group of acrylates, methacrylates, derivatives of acrylates, acrylamides, methacrylamides, derivatives of acrylamides, styrenic monomers. The monomer MB must have a quaternized N-atom structure with a polar substituent.

At least one monomer ($MB_s$) means that also two or more monomers MB may be present in the copolymer. Preferred are one or two monomers MB.

The monomer MB has the general formula $CH_2$=C($R_{11}$)—W—YZ wherein $R_{11}$ is hydrogen, halogen or cyano; or $R_{11}$ is $C_1$-$C_{18}$alkyl, $C_2$-$C_{18}$alkenyl, $C_3$-$C_{18}$cycloalkyl, $C_4$-$C_{18}$cycloalkenyl, $C_6$-$C_{24}$aryl, $C_1$-$C_{12}$alkyl-$C_6$-$C_{24}$aryl or $C_2$-$C_{12}$alkenyl-$C_6$-$C_{24}$aryl each of which optionally is substituted by one or more halogen or $OR_3$, $SR_3$ or $NR_4R_5$; and/or optionally is interrupted by one or more —O—, —S—, —$NR_4$—;

$R_3$ is hydrogen; or $R_3$ is $C_1$-$C_{20}$alkyl, $C_2$-$C_{20}$alkenyl, $C_3$-$C_{20}$cycloalkyl, $C_4$-$C_{20}$cycloalkenyl, $C_6$-$C_{24}$aryl, $C_1$-$C_{20}$alkyl-$C_6$-$C_{24}$aryl or $C_2$-$C_{20}$alkenyl-$C_6$-$C_{24}$ aryl each of which optionally is substituted by one or more halogen, $OC_1$-$C_{12}$alkyl, $SC_1$-$C_{12}$alkyl or $NR_4R_5$; and/or each of which is optionally interrupted by one or more —O—, —C(O)—, —C(O)O—, —S—, —NR$_4$—, $R_4$, $R_5$ independently of each other are hydrogen; or $R_4$, $R_5$ independently of each other are $C_1$-$C_{20}$alkyl, $C_2$-$C_{20}$alkenyl, $C_3$-$C_{20}$cycloalkyl, $C_4$-$C_{20}$cycloalkenyl, $C_6$-$C_{18}$aryl, $C_1$-$C_{20}$alkyl-$C_6$-$C_{24}$aryl or $C_2$-$C_{20}$alkenyl-$C_6$-$C_{24}$aryl each of which optionally is substituted by one or more halogen, OR$_3$, SR$_3$, C(O)R$_3$, N(C$_1$-C$_{12}$alkyl)$_2$; and/or optionally is interrupted by one or more —O—, —S—, —C(O)— or —NC$_1$-C$_{12}$alkyl; $R_4$ and $R_5$ can be optionally form 5-, 6- or 7-membered rings with each other and/or $R_3$ or $R_6$, W is direct bond or C(O)—X; or W is $C_1$-$C_{16}$alkylene, $C_1$-$C_{16}$alkenylene, $C_6$-$C_{18}$arylene, each of which optionally is interrupted by one or more —O—, —S—, —NR$_4$—, X is OC$_1$-C$_{16}$alkylene, OC$_1$-C$_{16}$alkenylene, —OC$_1$-C$_{16}$alkylene-NH—CO—OC$_1$-C$_{16}$alkylene —SC$_1$-C$_{16}$alkylene, —SC$_1$-C$_{16}$alkenylene, —NR$_4$C$_1$-C$_{16}$alkylene, —NR$_4$C$_1$-C$_{16}$alkenylene, —OC$_6$-C$_{18}$arylene, —SC$_6$-C$_{18}$arylene, —NR$_4$C$_6$-C$_{18}$arylene each of which optionally is interrupted by one or more —O—, —S—, —NR$_4$—, —NR$_4$C(O)O—, —NR$_4$C(O)S— or —NR$_4$C(O)NR$_4$—, Y is $C_2$-$C_{24}$cyclicammonium$^+$-R$_6$ or N$^+$R$_4$R$_5$R$_6$, $R_6$ is $C_1$-$C_{20}$alkyl, $C_1$-$C_{20}$alkenyl, $C_3$-$C_{20}$cycloalkyl, $C_4$-$C_{20}$cycloalkenyl, $C_6$-$C_{18}$aryl, $C_1$-$C_{20}$alkyl-$C_6$-$C_{24}$aryl or $C_2$-$C_{20}$alkenyl-$C_6$-$C_{24}$aryl each of which is substituted one or more than once by CN, O[C$_2$-C$_8$alkyleneO]$_m$R$_3$, S[C$_2$-C$_8$alkyleneO]$_m$R$_3$, O[C$_2$-C$_8$alkyleneS]$_m$R$_3$, O[C$_2$-C$_8$alkyleneN]$_m$R$_4$R$_5$, NR$_4$R$_5$[C$_2$-C$_8$alkyleneN]$_m$R$_4$R$_5$, C(O)R$_3$, C(O)OR$_3$, C(O)SR$_3$, C(O)NR$_4$R$_5$, S(O)R$_3$, S(O)$_2$R$_3$, S(O)$_2$OR$_3$, S(O)$_2$NR$_4$R$_5$, OS(O)$_2$R$_3$, OS(O)$_2$OR$_3$, P(O)(OR$_3$)$_2$, OP(O)(OR$_3$)$_2$, OC(O)R$_3$, OC(O)OR$_3$, OC(O)SR$_3$, OC(O)NR$_4$R$_5$, SC(O)R$_3$, SC(O)SR$_3$, SC(O)NR$_4$R$_5$, NR$_4$C(O)R$_3$, NR$_4$C(O)OR$_3$, NR$_4$C(O)SR$_3$, NR$_4$C(O)NR$_4$R$_5$, C(O)C(O)R$_3$, C(O)C(O)OR$_3$, C(O)C(O)SR$_3$, C(O)C(O)NR$_4$R$_5$, C(O)O$^-$, S(O)$_2$O$^-$ or P(O)OR$_3$O$^-$, provided that if $R_6$ is $C_1$-$C_{20}$alkyl, $C_1$-$C_2$alkenyl, $C_3$-$C_{20}$cycloalkyl, $C_4$-$C_{20}$cycloalkenyl, $C_6$-$C_{18}$aryl, $C_1$-$C_{20}$alkyl-$C_6$-$C_{24}$aryl or $C_2$-$C_{20}$alkenyl-$C_6$-$C_{24}$aryl each of which is substituted by one or more C(O)O$^-$, S(O)$_2$O$^-$ or P(O)OR$_3$O$^-$, Z is not existing.

Z is PF$_6^-$, BF$_4^-$, OH$^-$, F$^-$, Cl$^-$, Br$^-$ or I$^-$; or Z is $C_1$-$C_{40}$alkyl[C(O)O$^-$]$_n$, C$_1$-C$_{40}$alkenyl[C(O)O$^-$]$_n$, $C_3$-$C_{40}$cycloalkylC(O)O$^-$, $C_4$-$C_{40}$cycloalkenylC(O)O$^-$, $C_6$-$C_{24}$aryl[C(O)O$^-$]$_n$, $C_1$-$C_{40}$alkyl[S(O)$_2$O$^-$]$_n$, $C_1$-$C_{40}$alkenyl[S(O)$_2$O$^-$]$_n$, $C_3$-$C_{40}$cycloalkylS(O)$_2$O$^-$, $C_4$-$C_{40}$cycloalkenylS(O)$_2$O$^-$, $C_6$-$C_{24}$aryl[S(O)$_2$O$^-$]$_n$, $C_1$-$C_{40}$alkyl[P(O)OR$_3$O$^-$]$_n$, $C_1$-$C_{40}$alkenyl[P(O)OR$_3$O$^-$]$_n$, $C_3$-$C_{40}$cycloalkylP(O)OR$_3$O$^-$, $C_3$-$C_{40}$cycloalkenylP(O)OR$_3$O$^-$ or $C_6$-$C_{24}$aryl[P(O)OR$_3$O—]$_n$ each of which optionally is interrupted by one or more —O—, —S—, —NR$_4$—, —C(O)—, —C(O)O—, —C(O)S—, —C(O)NR$_4$—, —OC(O)O—, —SC(O)O—, —SC(O)S—, —SC(O)NR$_4$—, —OC(O)NR$_4$— or —NR$_4$C(O)NR$_4$—;

m is >1, preferred 1-120, most preferred 1-40,
n is >1, preferred 1-5, most preferred 1-2.

Preferred Monomers MB
Preferred Monomers MB

MB has preferably the general formula CH$_2$=CH—W—YZ or CH$_2$=C(CH$_3$)—W—YZ wherein W is a direct bond or C(O)X and X is —OC$_1$-C$_{16}$alkylene or —OC$_1$-C$_{16}$alkylene-NH—CO—OC$_1$-C$_{16}$alkylene or is —NHC$_1$-C$_{16}$alkylene.

Examples of preferred monomers MB are:

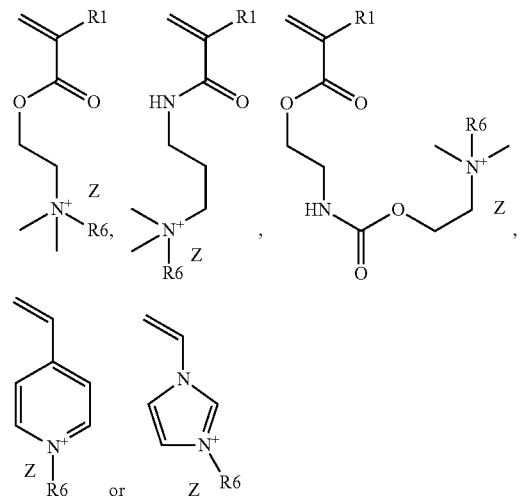

wherein $R_1$ is hydrogen or methyl and $R_6$ is —(CH$_2$)$_{1-18}$CN, —(CH$_2$)$_{1-18}$SO$_3^-$, —(CH$_2$)$_{1-18}$C(O)O$^-$, —CH$_2$—O[C$_2$-C$_8$alkyleneO]$_m$H, —CH$_2$C(O)CH$_3$, —CH$_2$CHO, —CH$_2$C(O)OC$_1$-C$_{18}$alkyl, —CH$_2$C(O)OH, —CH$_2$C(O)NH$_2$, —CH$_2$C(O)N(C$_1$-C$_{18}$alkyl)$_2$, —CH$_2$C(O)C(O)OC$_1$-C$_{18}$alkyl, —CH$_2$C(O)CH$_2$C(O)OC$_1$-C$_{18}$alkyl, —CH$_2$CH$_2$NHC(O)NH$_2$, or

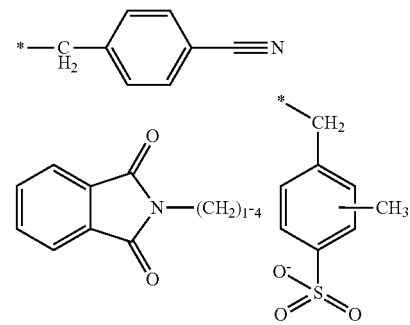

Z is Cl$^-$, Br$^-$ or I$^-$; or Z is $C_1$-$C_{40}$alkylC(O)O$^-$, $C_1$-$C_{40}$alkenylC(O)O$^-$, $C_6$-$C_{10}$arylC(O)O$^-$, $C_1$-$C_{40}$alkylS(O)$_2$O$^-$, $C_1$-$C_{40}$alkenylS(O)$_2$O$^-$, $C_6$-$C_{10}$arylS(O)$_2$O$^-$, $C_1$-$C_{40}$ alkylP(O)OR$_3$O$^-$ each of which optionally is interrupted by one or more —O—.

Examples of Especially Preferred Monomers MB are:

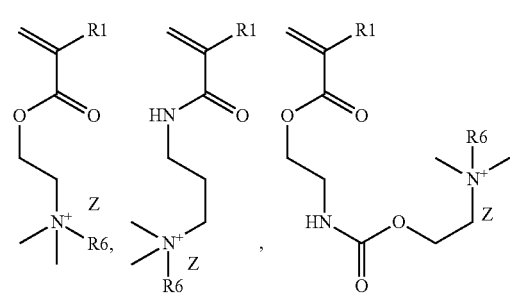

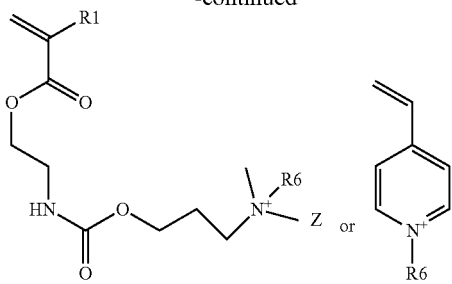

wherein R₁ is hydrogen or methyl and
R₆ is —CH₂CN, —CH₂OCH₂CH₂OCH₃, —CH₂CH₂OCH₂CH₂OCH₃, —CH₂C(O)CH₃, —CH₂CHO, —CH₂COOH, CH₂C(O)OCH₂CH₃, —CH₂C(O)NH₂, —CH₂C(O)N(CH₃)₂, —CH₂C(O)N(C₂H₅)₂, CH₂C(O)C(O)OCH₂CH₃, CH₂C(O)C(O)OCH₃, CH₂CH₂NHC(O)NH₂, CH₂CH₂CH₂SO₃⁻ or CH₂CH₂CH₂CH₂SO₃⁻

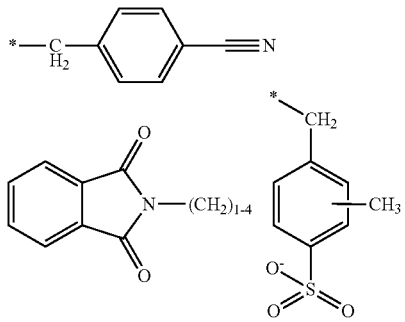

Z is Cl⁻, Br⁻ or I⁻;

The copolymer $MA_r$-$MB_s$ may optionally contain further monomers $MB'_{s'}$ of the general formula $CH_2=C(R_{11})$—W—Y'Z which are salts but do not have a polar substituent.

In one embodiment the copolymer $MA_r$-$MB_s$ comprises further monomers $MB'_{s'}$ of the general formula $CH_2=C(R_{11})$—W—Y'Z Preferred monomers $MB'_{s'}$ are the general formula $CH_2=C(R_{11})$—W—Y'Z are

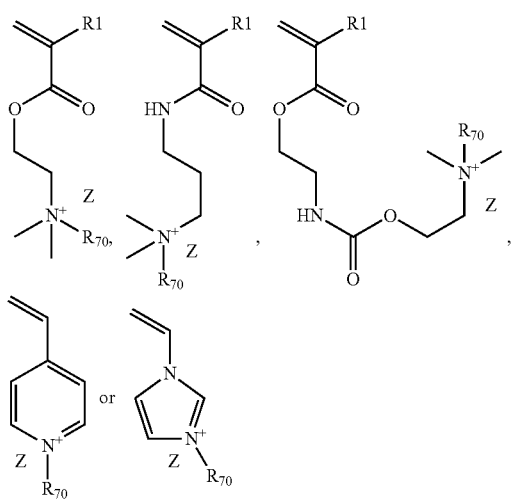

wherein R₁ is hydrogen or methyl and
R₇₀ is hydrogen, benzyl, o-chlorbenzyl, o,p-chlorbenzyl, 1-naphtyl, C₁-C₄alkyl, C₁-C₄alkenyl Z is Cl⁻, Br⁻ or I⁻; or Z is C₁-C₄₀alkylC(O)O⁻, C₁-C₄₀alkenylC(O)O⁻, C₆-C₁₀arylC(O)O⁻, C₁-C₄₀alkylS(O)₂O⁻, C₁-C₄₀alkenylS(O)₂O⁻, C₆-C₁₀arylS(O)₂O⁻, C₁-C₄₀alkylP(O)OR₃O⁻ each of which optionally is interrupted by one or more —O—.

Especially preferred monomers MB's' of the general formula $CH_2=C(R_{11})$—W—Y'Z are

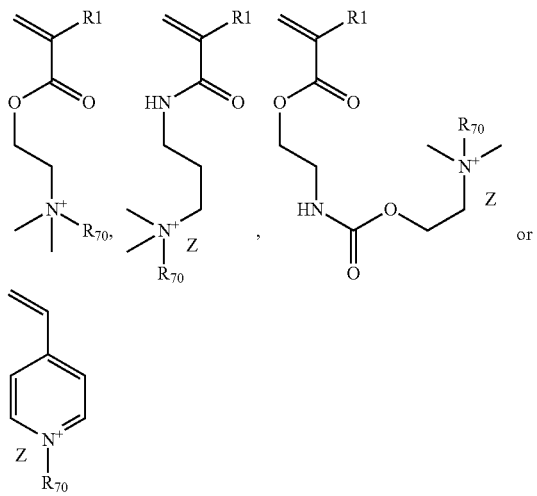

wherein
R₁ is hydrogen or methyl
R₇₀ is hydrogen, benzyl, o-Chlorlbenzyl
Z is Cl⁻, Br⁻ or I⁻; or Z is C₁-C₄₀alkylC(O)O⁻, C₁-C₄₀alkenylC(O)O⁻, C₁-C₄₀alkylS(O)₂O⁻, C₁-C₄₀alkenylS(O)₂O⁻, C₁-C₄₀alkylP(O)OR₃O⁻ each of which optionally is interrupted by one or more —O—.

The Proviso

The proviso is necessary because of technical reasons. If R₆ is for example —(CH₂)₃—SO₃ then the ammonium cation already has a counter-anion. An example is:

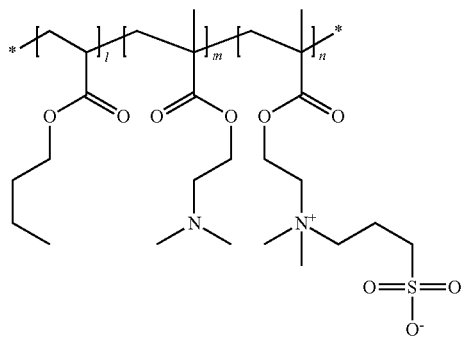

Preferred is a copolymer as described above and made by controlled polymerization.

Especially preferred a copolymer as described above and made by nitroxide mediated controlled polymerization resulting in copolymers $In-[(MA_r-MB_s)-(E)z]t$ wherein
($MA_r$) and ($MB_s$) are as defined above
In is an initiator fragment capable to initiate radical polymerisation,
E is a group bearing at least one stable free nitroxyl radical, which is bound via the oxygen atom to the polymer or copolymer; or a group which results from a substitution or elimination reaction of the attached stable free nitroxyl radical,
z=≥1
t=1 to 20.
The Initiator IN-E
All the initiators

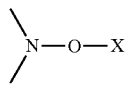

as disclosed in WO 2005 059048 are suitable.
E-In is preferably of formula A, B or O

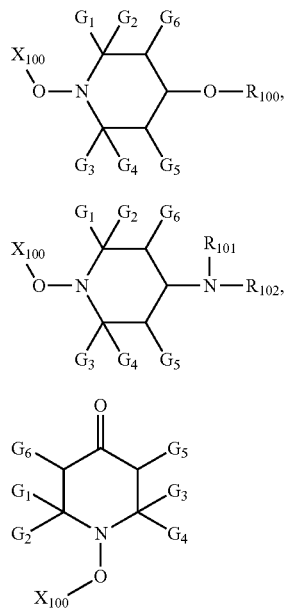

wherein
$R_{100}$ is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an, -unsaturated carboxylic acid having 3 to 5 carbon atoms or of an aromatic carboxylic acid having 7 to 15 carbon atoms;
$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;
$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH$(OH)—Z or of the formula —CO—Z or —CONH—Z wherein Z is hydrogen, methyl or phenyl;
$G_6$ is hydrogen,
$G_5$ is hydrogen or $C_1$-$C_4$alkyl,
$G_1$ and $G_3$ are methyl,
$G_2$ and $G_4$ are ethyl or propyl or $G_1$ and $G_2$ are methyl and $G_3$ and $G_4$ are ethyl or propyl; and $X_{100}$ is selected from the group consisting of
—$CH_2$-phenyl, $CH_3CH$-phenyl, $(CH_3)_2$C-phenyl, $(C_5$-$C_6$cycloalkyl$)_2$CCN, $(CH_3)_2$CCN,

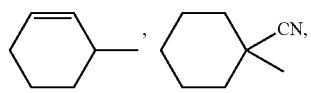

—$CH_2CH$=$CH_2$, $CH_3CH$—CH=$CH_2$ ($C_1$-$C_4$alkyl)$CR_{20}$—C(O)-phenyl, (C1-C4)alkyl-$CR_{20}$—C(O)—($C_1$-$C_4$)alkoxy, ($C_1$-$C_4$)alkyl-$CR_{20}$—C(O)—($C_1$-$C_4$)alkyl, ($C_1$-$C_4$)alkyl-$CR_{20}$—C(O)—N-di($C_1$-$C_4$)alkyl, ($C_1$-$C_4$)alkyl-$CR_{20}$—C(O)—NH($C_1$-$C_4$)alkyl, ($C_1$-$C_4$)alkyl-$CR_{20}$—C(O)—$NH_2$, wherein $R_{20}$ is hydrogen or ($C_1$-$C_4$)alkyl.

The above compounds and their preparation are described in G 2335190 and GB 2 361 235.
Preferred initiators are:

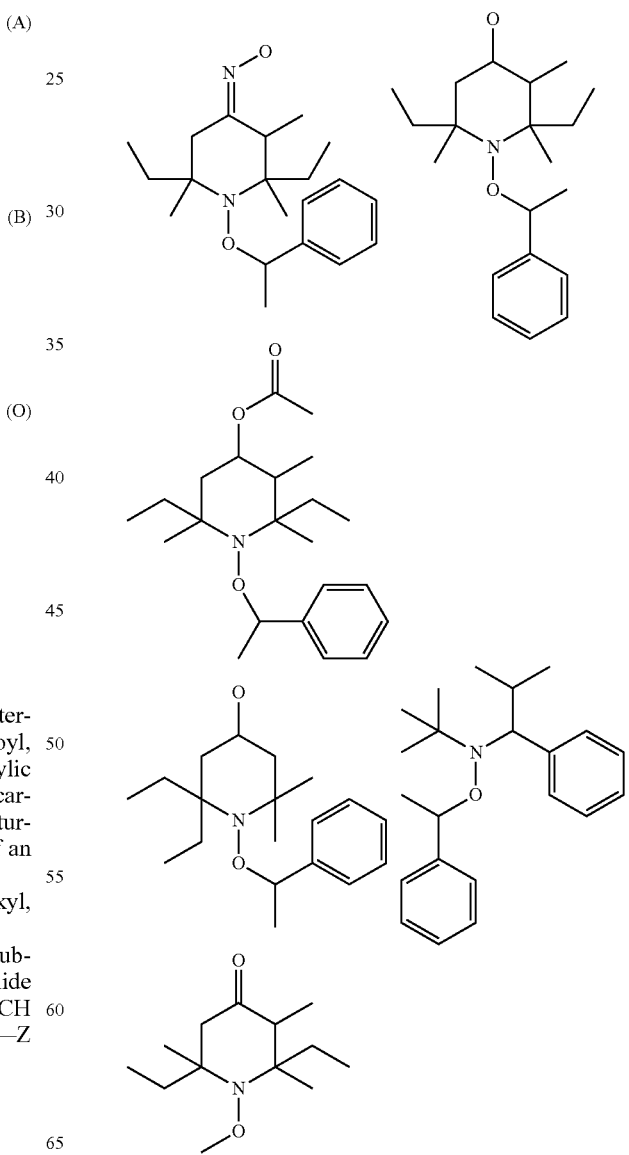

An especially preferred initiator is

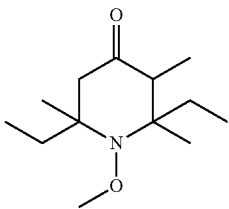 [SMILES: CCC1(C)CC(=O)C(C)C(C)(CC)N1OC]

In this case the initiating fragment (In) in formula (I) is

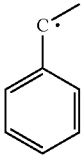

and the group (E) is

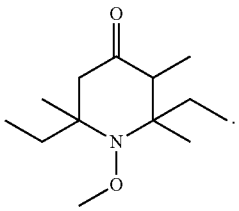 [SMILES: CCC1(C)CC(=O)C(C)C(C)(CC)N1OC]

The initiator IN-E comprises the nitroxyl radical E and the initiator fragment In and is derived from the polymerisation reaction which is nitroxyl mediated controlled polymerization.

There are essentially two suitable routes:
b1) polymerization in the presence of alkoxyamine initiator/ regulator compounds having the structural element

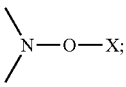

and
b2) polymerization in the presence of a stable nitroxyl free radical having the structural element

and a radical initiator (source of free radicals).

The initiator IN-E may also be derived from Atom transfer radical polymerization (ATRP).

In one embodiment the invention refers to a coating composition comprising:
a) film forming binder resin, and
b) a copolymer,
c) optional other conventional coating components and/or additives.

The film forming binder a) is selected from:

Solvent based resins, water based resins, emulsion polymers, solution polymers. The resins comprise all kinds of crosslinking mechanism and coating systems based on 1 component (1p) as well as 2p and multi component systems, e.g. thermosetting resins, room temperature curable resins, radiation-curable resins. Also included are physically drying coating systems like thermoplastic acrylic resins.

The resins comprise state of the art polymer chemistry used in coatings: e.g. saturated polyesters, unsaturated polyesters, polyacrylates, styrene-acrylic resins, polyurethanes, epoxy resins, nitrocellulose resins, hybrid systems like polyester/ polyurethanes, polyacrylate/polyurethanes, alkyd/melamine, polyester/CAB/melamine, polyacrylate/CAB/melamine, etc.

Conventional coating components and/or additives are pigments; crosslinking agents; commercial levelling agents; photoinitiators; photosensitizers; degassing agents; optical brighteners; benzoin; flow modifiers; anti-blocking agents; ultraviolet absorbers; antistatic agents; antioxidants; agents to improve scratch resistance and the like.

The novel copolymers are especially useful in color filter application.

In one embodiment the color filter composition is comprising
a) photo resist binder,
b) transparent pigment,
c) optionally a solvent and/or optionally a photoinitiator or a photolatent catalyst,
d) dispersant which is a copolymer discussed above.

The term photo resist binder refers to a photosensitive resin which is preferably an acid-curable resin or a photo curable resin such as acrylate, photo curable acrylate oligomer, polyester, alkyd, melamine, urea, epoxy and phenolic resins or mixtures thereof. Acid-curable resins of that kind are generally known and are described, for example, in "Ullmann's Encyclopdie der technischen Chemie", Edition 4, Vol. 15 (1978), pp. 613-628.

Preferred are (meth)acrylate/(meth)acrylic acid copolymers.

Preferable examples of copolymers are copolymers of methyl(meth)acrylate and (meth)-acrylic acid, copolymers of benzyl(meth)acrylate and (meth)acrylic acid, copolymers of methyl(meth)acrylate/, ethyl(meth)acrylate and (meth) acrylic acid, copolymers of benzyl(meth)acrylate, (meth) acrylic acid and styrene, copolymers of benzyl(meth)acrylate, (meth)acrylic acid and 2-hydroxyethyl(meth)acrylate, copolymers of methyl(meth)acrylate/, butyl(meth)acrylate, (meth)acrylic acid and styrene, copolymers of methyl(meth) acrylate, benzyl(meth)acrylate, (meth)acrylic acid and hydroxyphenyl(meth)acrylate, copolymers of methyl(meth) acrylate, (meth)acrylic acid and polymethyl(meth)acrylate macromonomer, copolymers of benzyl(meth)acrylate, (meth)acrylic acid and polymethyl(meth)acrylate macromonomer, copolymers of tetrahydrofurfuryl(meth)acrylate, styrene and (meth)acrylic acid, copolymers of methyl (meth)acrylate, (meth)acrylic acid and polystyrene macromonomer, copolymers of benzyl(meth)acrylate, (meth)acrylic acid and polystyrene macromonomer, copolymers of benzyl(meth)acrylate, (meth)acrylic acid, 2-hydroxyethyl(meth)acrylate and polystyrene macromonomer, copolymers of benzyl(meth)acrylate, (meth)acrylic acid, 2-hydroxypropyl(meth)acrylate and polystyrene macro monomer, copolymers of benzyl(meth)acrylate, (meth) acrylic acid, 2-hydroxy-3-phenoxypropyl(meth)acrylate and polymethyl(meth)acrylate macromonomer, copolymers of methyl(meth)acrylate, (meth)acrylic acid, 2-hydroxyethyl (meth)acrylate and polystyrene macromonomer, copolymers of benzyl(meth)acrylate, (meth)acrylic acid, 2-hydroxyethyl (meth)acrylate and polymethyl(meth)acrylate macromonomer, copolymers of N-phenylmaleimide, benzyl(meth)acrylate, (meth)acrylic acid and styrene, copolymers of benzyl (meth)acrylate, (meth)acrylic acid, N-phenylmaleimide, mono-[2-(meth)acryloyloxyethyl]succinate and styrene, copolymers of allyl(meth)acrylate, (meth)acrylic acid, N-phenylmaleimide, mono-[2-(meth)acryloyloxyethyl]succinate and styrene, copolymers of benzyl(meth)acrylate, (meth)acrylic acid, N-phenylmaleimide, glycerol mono(meth)acrylate and styrene, copolymers of benzyl(meth)acrylate, [omega]-carboxypolycaprolactone mono(meth)acrylate, (meth)acrylic acid, N-phenylmaleimide, glycerol mono(meth)acrylate and styrene, and copolymers of benzyl (meth)acrylate, (meth)acrylic acid, N-cyclohexylmaleimide and styrene.

A photo curable acrylate oligomer is preferably present in addition to the photo curable resin. Photo curable acrylate oligomers usable herein include dipentaerythritol hexaacryl (DPHA), dipentaerythritol pentaacrylate (DPPA), pentaerythritol triacrylate (PETTA), trimethylolpropane triacrylate (TMPTA), and trimethylolpropane triacrylate (TMPTA) and the like.

The term transparent pigment refers to a pigment which gives a transparently colored ink when dispersed.

The pigment may be inorganic or preferably organic, for example carbon black or pigments of the 1-aminoanthraquinone, anthanthrone, anthrapyrimidine, azo, azomethine, quinacridone, quinacridonequinone, quinophthalone, dioxazine, diketopyrrolopyrrole, flavanthrone, indanthrone, isoindoline, isoindolinone, isoviolanthrone, perinone, perylene, phthalocyanine, pyranthrone or thioindigo series, including those, where applicable, in the form of metal complexes or lakes, in particular unsubstituted or partially halogenated phthalocyanines such as copper, zinc or nickel phthalocyanines, 1,4-diketo-3,6-diaryl-pyrrolo[3,4-c]pyrroles, dioxazines, isoindolinones, indanthrones, perylenes and quinacridones. Azo pigments may be, for example, mono- or dis-azo pigments from any known sub-class, obtainable, for example, by coupling, condensation or lake formation.

Notably useful are the pigments described in the Colour Index, including Pigment Yellow 1, 3, 12, 13, 14, 15, 17, 24, 34, 42, 53, 62, 73, 74, 83, 93, 95, 108, 109, 110, 111, 119, 120, 123, 128, 129, 139, 147, 150, 151, 154, 164, 168, 173, 174, 175, 180, 181, 184, 185, 188, 191, 191:1, 191:2, 193, 194 and 199; Pigment Orange 5, 13, 16, 22, 31, 34, 40, 43, 48, 49, 51, 61, 64, 71, 73 and 81; Pigment Red 2, 4, 5, 23, 48, 48:1, 48:2, 48:3, 48:4, 52:2, 53:1, 57, 57:1, 88, 89, 101, 104, 112, 122, 144, 146, 149, 166, 168, 170, 177, 178, 179, 181, 184, 185, 190, 192, 194, 202, 204, 206, 207, 209, 214, 216, 220, 221, 222, 224, 226, 242, 248, 254, 255, 262, 264, 270 and 272; Pigment Brown 23, 24, 25, 33, 41, 42, 43 and 44; Pigment Violet 19, 23, 29, 31, 37 and 42; Pigment Blue 15, 15:1, 15:2, 15:3, 15:4, 15:6, 16, 25, 26, 28, 29, 60, 64 and 66; Pigment Green 7, 17, 36, 37, 50 and 58 Pigment Black 7, 12, 27, 30, 31, 32, 37 and 582; Vat Red 74; 3,6-di(3',4'-dichloro-phenyl)-2,5-dihydropyrrolo[3,4-c]pyrrole-1,4-dione, 3,6-di(4'-cyano-phenyl)-2,5-dihydro-pyrrolo[3,4-c]pyrrole-1,4-dione and 3-phenyl-6-(4'-tert-butyl-phenyl)-2,5-dihydro-pyrrolo[3,4-c]pyrrole-1,4-dione; and mixtures and solid solutions thereof.

Solvent

Normally the compositions according to the invention are dissolved in a suitable solvent before application to the substrate. Examples of such solvents include ethylene dichloride, cyclohexanone, cyclopentanone, 2-heptanone, gamma-butyrolactone, methyl ethyl ketone, ethylene glycol monomethyl ether, ethylene glycol monoethyl ether, 2-methoxyethyl acetate, 3-methoxybuthyl acetate, 2-ethoxyethyl acetate, 2-ethoxyethanol, diethyl glycol dimethyl ether, ethylene glycol mono-ethyl ether acetate, ethylene glycol monobuthyl ether acetate, diethylene glycol monobuthyl ether acetate, propylene glycol monomethyl ether, propylene glycol monomethyl ether acetate, dipropylene glycol methyl ether acetate, toluene, ethyl acetate, methyl lactate, ethyl lactate, methylmethoxy propionate, ethylethoxy propionate, methyl pyruvate, ethyl pyruvate, propyl pyruvate, N,N-dimethyl-formamide, dimethyl sulfoxide, N-methylpyrrolidone and tetrahydrofuran. Such solvents can be used individually or in combinations. Preferred examples thereof are esters, such as 2-methoxyethyl acetate, ethylene glycol monoethyl ether acetate, propylene glycol monomethyl ether acetate, methylmethoxy propionate, ethylethoxy propionate and ethyl lactate.

Photoinitiator:

Any photoinitiator or photolatent catalyst may be used when desired. The photoinitiator or photolatent catalyst is not limited. Preferred are photoinitiators selected from
1. Alpha-hydroxyketones (AHK), alpha-alkoxyketones (benzildimethylketals DBK) and alpha-aminoketones (AAK),
2. Benzophenones,
3. Mono- and bisacylphosphine oxides (BAPO),
4. Phenyl-glyoxylates,
5. Isopropylthioxanthone (ITX),
6. Oxime-esters,
7. Aminobenzoates
8. Latent acids and bases
and blends thereof.

The invention further relates to a method for producing a color filter, which comprises coating the color filter composition described above on a substrate, followed by exposure and development.

A "substrate" means any carrier material adapted to be coated with photoresist layers for the purpose of exposure. For this purpose frequently glass plates are used, which may be colored black or coated. Furthermore, plastic foils or metal foils that are already provided with a grating image, preferably in the form of an embossing, are suitable as substrates.

Examples of the coating of the photosensitive film include slit coating using a coating device having slit type nozzles, slit-and-spin coating that first coats using a nozzle and then coats using a spin coater, die coating, and curtain flow coating. Of these coating methods, the slit-and-spin coating is preferred. After the coating, the photosensitive resin composition may be prebaked to remove volatile ingredients such as solvents, thereby forming the photosensitive resin film containing substantially no volatile ingredient. The photosensitive resin film may have a thickness of about 1 to 10 µm.

Next, the photosensitive film is subjected to a first exposure through a mask. The mask has a pattern suitable for the function of the hardened resin pattern.

The photoresist resin film is then developed by puddle development, immersion development, or spray development. The development may be performed by using an alkaline aqueous solution. The alkaline aqueous solution contains an inorganic alkaline compound or an organic alkaline compound.

The copolymers are used as pigment dispersants. The pigment is preferably dispersed in an organic solvent.

The copolymers are especially used to prepare paints, printing inks, inkjet inks, color filters and color resists.

The invention further relates to the use of a copolymer discussed above to prepare paints, printing inks, inkjet inks, color resists and inkjet inks for color filters.

EXAMPLES

The following examples illustrate the invention.
Materials use and their abbreviations.
Monomers: Butylacrylate (BA),
  Hydroxyethylacrylate (HEA),
  hydroxypropylacrylate (HPA),
  4-vinyl-pyridine (4-VP),
  N,N-Dimethylaminoethylmethacrylate (DMAEMA),
  N,N-Dimethylaminopropylmethacrylate (DMAPMA).
Modification agents: Benzylchloride (BnCl),
  methoxy-poly-ethyleneglycole (MPEG 550-OH).
Solvents: methoxypropylacetate (MPA),
  Xylene,
  methoxypropanol (MP),
  polystyrene (PS),
  tetrahydrofurane (THF),
  polyethyleneoxide (POE/PEG).
ATRP process: initiator is 2-bromoethylpropionate (MBP), the catalyst is $CuBr/CuBr_2$, the ligand is N,N,N',N'',N''-pentamethyldiethyltriamine (PMDETA).

NOR Initiator/regulator is compound O1

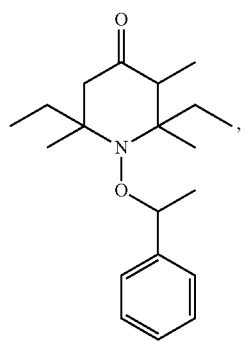
(O1)

which is prepared according to GB 2335190.

All other materials are commercially available and were used as received.

A) Preparation of Polymers and Copolymers

Example A1

Synthesis of a Linear Polymer Poly(BA)

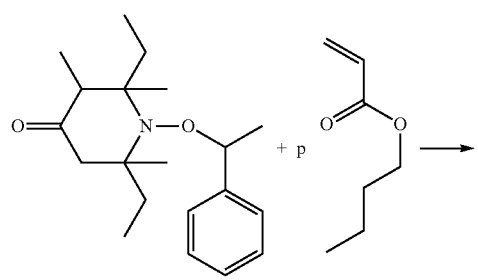

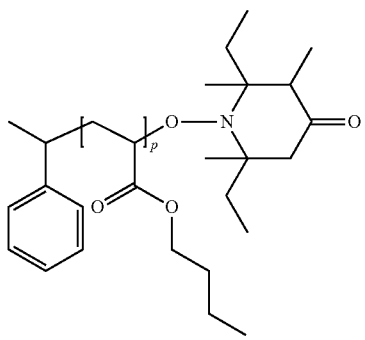

In a 3-necked 1000 ml round bottom flask with magnetic stirring bar, cooler, thermometer, dropping funnel 150.10 g n-Butylacrylate (n-BA, 128.17 g/mol), 8.55 g compound O1 (317.48 g/mol) and 122.13 g of MPA were added, three times degassed with $N_2$/vacuum and polymerized at 135° C. under $N_2$ until a conversion of around 8 mol % is reached. 338.89 g of n-BA is slowly added to the reaction with the dropping funnel and polymerized at 135° C. under $N_2$ until a conversion of around 48 mol %. Residual monomers and solvents were distilled of at 80° C. and 12 mbar.

Yield 47%, GPC (THF, PS-Standard, Mn=7800 g/mol, PD=1.27), liquid.

Example A2

Synthesis of a Block Copolymer Poly(n-BA-b-DMAEMA)

In a 200 ml flask equipped with a magnetic stirring bar and distillation column are loaded 80 g of A1 and 80 g of N,N-Dimethylaminoethyl methacrylamide (DMAEMA) and were heated under $N_2$ to 145° C. After 2 hours the reaction was terminated and non-reacted monomer DMAEMA was distilled off at high vacuum.

96 g of block copolymer were isolated; GPC (THF, PS-Standard, Mn=11000 g/mol; PD=1.313), yellow viscous liquid

Example A3

Synthesis of a Block Copolymer Poly[n-BA-b-(DMAEMA-Co-Quaternized DMAEMA-o-ClBn)]Cl⁻ by Quaternization In a 100 mL flask equipped with a magnetic stirring bar and distillation column are loaded 14 g of a Poly[n-BA-b-DMAEMA], 1.0 g of o-Chlorobenzylchloride (o-ClBnCl) and 16 g of 1-methoxy-2-propanol. The mixture is heated to 95° C. for 4 h.

After the reaction, 31.0 g of liquid polymer are obtained $^1$H-NMR and amine value measurement indicate quantitative conversion for quaternization.

Example A4

Synthesis of a Block Copolymer Poly[n-BA-b-(DMAEMA-Co-Quaternized DMAEMA-Butylsulfonic Acid Anion)] by Quaternization MA is butylacrylate and DMAEMA
MB=

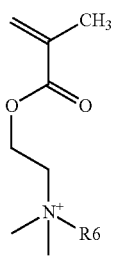

R6=—CH$_2$—CH$_2$—CH$_2$—CH$_2$—SO$_3^-$
Z is not present

In a 100 mL flask equipped with a magnetic stirring bar and distillation column are loaded 14 g of a Poly[n-BA-b-DMAEMA], 0.9 g of 1,4-Butanesulfone and 16 g of 1-methoxy-2-propanol. The mixture is heated to 95° C. for 4 h.

After the reaction, 30.9 g of liquid polymer are obtained $^1$H-NMR and amine value measurement indicate quantitative conversion for quaternization.

Example A5

Synthesis of a Block Copolymer Poly[n-BA-b-(DMAEMA-Co-Quaternized DMAEMA-Acetamidyl)]-I$^-$ by Quaternization MA is butylacrylate and DMAEMA
MB=

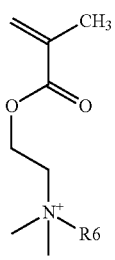

R6=—CH$_2$—CO—NH$_2$; Z is I$^-$

In a 100 mL flask equipped with a magnetic stirring bar and distillation column are loaded 14 g of a Poly[n-BA-b-DMAEMA], 0.9 g of 2-Iodoacetamide and 16 g of 1-methoxy-2-propanol. The mixture is heated to 95° C. for 4 h.

After the reaction, 20.9 g of liquid polymer are obtained $^1$H-NMR and amine value measurement indicate quantitative conversion for quaternization.

Example A6

Synthesis of a Block Copolymer Poly[n-BA-b-(DMAEMA-Co-Quaternized DMAEMA-Acetamidyl)]-Cl$^-$ by Quaternization MA is butylacrylate and DMAEMA
MB=

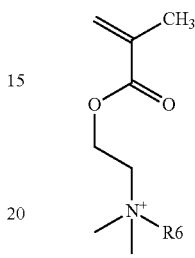

R6=—CH$_2$—CO—NH$_2$ Z is Cl$^-$ 30.6 g of liquid polymer are obtained by the same quaternization condition as Example A5 with 0.6 g of 2-Chloroacetamide as quaternization agent.

$^1$H-NMR and amine value measurement indicate quantitative conversion for quaternization.

Example A7

Synthesis of a Block Copolymer Poly[n-BA-b-(DMAEMA-Co-Quaternized DMAEMA-Methoxyethoxyethyl)]-Br$^-$ by Quaternization MA is butylacrylate and DMAEMA
MB=

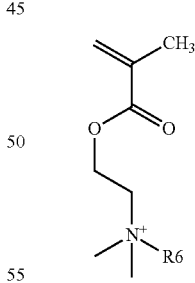

R6=—CH$_2$—CH$_2$—O—CH$_2$CH$_2$—OCH$_3$ Z is Br$^-$

In a 100 mL flask equipped with a magnetic stirring bar and distillation column are loaded 14 g of a Poly[n-BA-b-DMAEMA], 1.2 g of 1-Bromo-(2-methoxyethoxy)ethane and 16 g of 1-methoxy-2-propanol. The mixture is heated to 95° C. for 4 h.

After the reaction, 31.2 g of liquid polymer are obtained $^1$H-NMR and amine value measurement indicate quantitative conversion for quaternization.

Example A8

Synthesis of a Block Copolymer Poly[n-BA-b-(DMAEMA-Co-Quaternized DMAEMA-Methoxy-ethoxymethyl)]-Cl⁻ by Quaternization MA is butylacrylate and DMAEMA
MB=

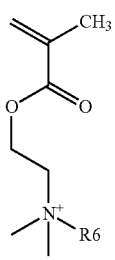

R6=—CH$_2$—CH$_2$—O—CH$_2$CH$_2$—OCH$_3$ Z is Cl⁻

30.8 g of liquid polymer are obtained by the same quaternization condition as Example A7 with 0.8 g of 2-Methoxyethoxymethyl chloride as quaternization agent.

$^1$H-NMR and amine value measurement indicate quantitative conversion for quaternization.

Example A9

Synthesis of a Linear Block Copolymer Poly(n-BA-b-4VP)

In a 3-necked 500 ml round bottom flask with magnetic stirring bar, cooler, thermometer 214.18 g poly(n-BA) of example A1, 70.9 g 4-vinylpyridine (4-VP, 105.14 g/mol) and 79.70 g of MPA are added, three times degassed with N$_2$/vacuum and polymerized at 125° C. under N$_2$ for 8 h. Residual monomers and solvents are distilled off at 80° C. and 12 mbar.

Yield 85%, GPC (THF, PS-Standard, Mn=8600 g/mol, PD=1.24), liquid.

Example A10

Synthesis of a Block Copolymer Poly[n-BA-b-(4VP-Co-Quaternized 4VP-Butylsulfonic Acid Anion)] by Quaternization MA is Butylacrylate and vinylpyridine
MB is

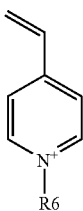

R6=—CH$_2$—CH$_2$—CH$_2$—CH$_2$—SO$_3^-$
Z is not present

In a 50 mL flask equipped with a magnetic stirring bar and distillation column are loaded 4.06 g of a Poly[n-BA-b-4VP], 0.23 g of 1,4-Butanesulfone and 6.08 g of 1-methoxy-2-propanol. The mixture is heated to 95° C. for 4 h.

After the reaction, 10.4 g of liquid polymer are obtained
$^1$H-NMR and amine value measurement indicate quantitative conversion for quaternization.

Example A11

Synthesis of a Block Copolymer Poly[n-BA-b-(DMAEMA-Co-Quaternized DMAEMA-2-Acetic Acid)]-Br⁻ by Quaternization MA is butylacrylate and DMAEMA
MB=

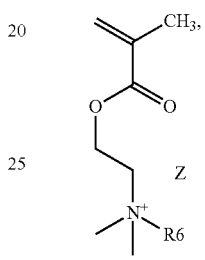

R6=—CH$_2$—COOH, Z=Br⁻

In a 50 mL flask equipped with a magnetic stirring bar and distillation column are loaded 10.8 g of a Poly[n-BA-b-DMAEMA], 0.73 g of 2-bromoactic acid and 10.19 g of 1-methoxy-2-propanol. The mixture is heated to 95° C. for 4 h.

After the reaction, 21.7 g of liquid polymer are obtained
$^1$H-NMR and amine value measurement indicate quantitative conversion for quaternization.

Example A12

Synthesis of a Block Copolymer Poly[n-BA-b-(DMAEMA-Co-(Quaternized DMAEMA-ClBn)-Cl⁻-Co-(Quaternized DMAEMA-Butylsulfonic Acid Anion))] by Quaternization MA=BA and DMAEMA
MB=

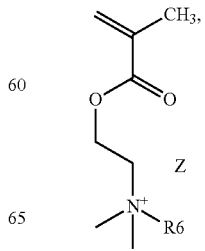

R6=—CH₂—CH₂—CH₂—CH₂—SO₃⁻
MB'=

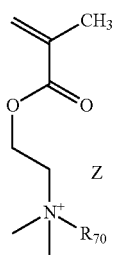

R70=-o-chlorobenzyl; Z=Cl⁻

In a 100 mL flask equipped with a magnetic stirring bar and distillation column are loaded 10.8 g of Poly[n-BA-b-DMAEMA], 0.56 g of o-ClBnCl, 0.24 g of 1,4-Butanesulfone and 9.2 g of 1-methoxy-2-propanol. The mixture is heated to 110° C. for 4.5 h.

After the reaction, 20.8 g of liquid polymer are obtained
¹H-NMR and amine value measurement indicate quantitative conversion for quaternization.

Example A13

Synthesis of a Block Copolymer Poly[n-BA-b-(DMAEMA-Co-(Quaternized DMAEMA-Acetamidyl)-Cl⁻-Co-(Quaternized DMAEMA-Butylsulfonic Acid Anion))] by Quaternization MA=BA and DMAEMA
MB=

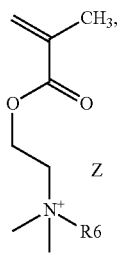

R6=—CH₂—CO—NH₂, Z=Cl⁻
MB=

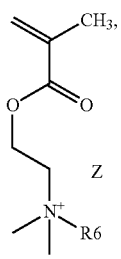

R6=—CH₂—CH₂—CH₂—CH₂—SO₃⁻

In a 50 mL flask equipped with a magnetic stirring bar and distillation column are loaded 10.8 g of Poly[n-BA-b-DMAEMA], 0.16 g of 2-Chloroacetamide, 0.48 g of 1,4-Butanesulfone and 9.2 g of 1-methoxy-2-propanol. The mixture is heated to 110° C. for 4.5 h.

After the reaction, 20.6 g of liquid polymer are obtained
¹H-NMR and amine value measurement indicate quantitative conversion for quaternization.

Example A14

Synthesis of a Block Copolymer Poly[n-BA-b-(DMAEMA-Co-Quaternized DMAEMA-Ethylpyruvatyl)]-Br⁻ by Quaternization MA=BA and DMAEMA
MB=

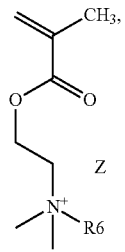

R6=—CH₂—CO—COOCH₂—CH₃, Z=Br⁻

In a 50 mL flask equipped with a magnetic stirring bar and distillation column are loaded 8.11 g of a Poly[n-BA-b-DMAEMA], 0.77 g of Ethylbromopyruvate and 6.89 g of 1-methoxy-2-propanol. The mixture is heated to 95° C. for 4.5 h.

After the reaction, 15.8 g of liquid polymer are obtained
¹H-NMR and amine value measurement indicate quantitative conversion for quaternization.

Example A15

Synthesis of a Block Copolymer Poly[n-BA-b-(DMAEMA-Co-Quaternized DMAEMA-Phthalimide Ethyl)]-Br⁻ by Quaternization MA=BA and DMAEMA
MB is

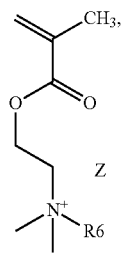

R6=

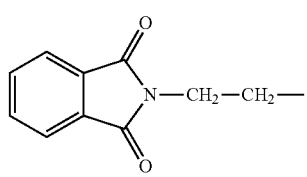

Z=Br⁻

In a 50 mL flask equipped with a magnetic stirring bar and distillation column are loaded 5.41 g of a Poly[n-BA-b-DMAEMA], 0.67 g of N-(2-bromoethyl)phthalimide and 4.59 g of 1-methoxy-2-propanol. The mixture is heated to 95° C. for 4.5 h.

After the reaction, 10.67 g of liquid polymer are obtained
¹H-NMR and amine value measurement indicate quantitative conversion for quaternization.

Example A16

Synthesis of a Block Copolymer Poly[n-BA-b-(DMAEMA-Co-Duaternized DMAEMA-Cyanomethyl)]-Br⁻ by Quaternization MA=BA and DMAEMA
MB=

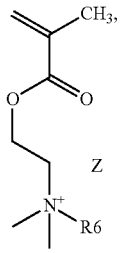

R6=—CH₂—CN, Z=Br⁻

In a 50 mL flask equipped with a magnetic stirring bar and distillation column are loaded 5.41 g of a Poly[n-BA-b-DMAEMA], 0.31 g of 1-Bromoacetonitrile and 4.59 g of 1-methoxy-2-propanol. The mixture is heated to 95° C. for 4 h.

After the reaction, 10.31 g of liquid polymer are obtained
¹H-NMR and amine value measurement indicate quantitative conversion for quaternization.

Example A17

Synthesis of a Block Copolymer Poly[n-BA-b-(DMAEMA-Co-Quaternized DMAEMA-N,N-Diethylacetamidyl)]-Cl⁻ by Quaternization MA=BA and DMAEMA
MB=

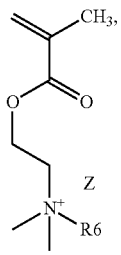

R6 is —CH₂—CO—N(C₂H₅)₂ Z=Cl⁻

In a 50 mL flask equipped with a magnetic stirring bar and distillation column are loaded 7.85 g of a Poly[n-BA-b-DMAEMA], 0.54 g of 2-Chloro-N,N-diethylacetamide and 8.24 g of 1-methoxy-2-propanol. The mixture is heated to 120° C. for 4.5 h.

After the reaction, 16.6 g of liquid polymer are obtained
¹H-NMR and amine value measurement indicate quantitative conversion for quaternization.

Example A18

Synthesis of a Block Copolymer Poly[n-BA-b-(DMAEMA-Co-Quaternized DMAEMA-Benzoylmethyl)]-Br⁻ by Quaternization MA=BA and DMAEMA
MB=

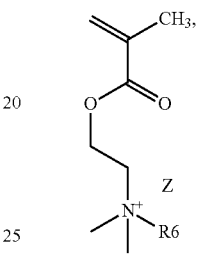

R6=—CH₂—CO-Phenyl, Z=Br⁻

In a 50 mL flask equipped with a magnetic stirring bar and distillation column are loaded 10.56 g of a Poly[n-BA-b-DMAEMA], 0.97 g of 2-Bromoacetophenone and 9.73 g of 1-methoxy-2-propanol. The mixture is heated to 95° C. for 4.5 h.

After the reaction, 22.26 g of liquid polymer are obtained
¹H-NMR and amine value measurement indicate quantitative conversion for quaternization.

Example A19

Synthesis of a Block Copolymer Poly[n-BA-b-(DMAEMA-Co-Quaternized DMAEMA-Ethylacetate)]-Br⁻ by Quaternization MA=BA and DMAEMA
MB=

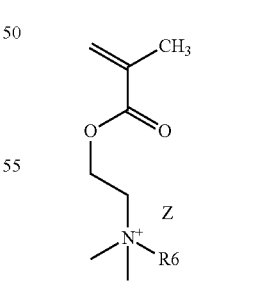

R6=—CH₂—COO—CH₂—CH₃, Z=Br⁻

In a 50 mL flask equipped with a magnetic stirring bar and distillation column are loaded 9.40 g of a Poly[n-BA-b-DMAEMA], 0.76 g of 2-Bromoethylacetate and 10.6 g of 1-methoxy-2-propanol. The mixture is heated to 95° C. for 4.5 h.

After the reaction, 20.76 g of liquid polymer are obtained $^1$H-NMR and amine value measurement indicate quantitative conversion for quaternization.

Example A20

Synthesis of a Block Copolymer Poly[n-BA-b-(DMAEMA-Co-Quaternized DMAEMA-4-Cyanobenzyl)]-Cl$^-$ by Quaternization MA=BA and DMAEMA
MB=

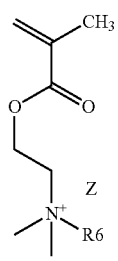

R6=

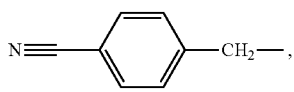

Z=Cl$^-$

In a 50 mL flask equipped with a magnetic stirring bar and distillation column are loaded 9.40 g of a Poly[n-BA-b-DMAEMA], 0.69 g of 4-Cyanobenzylchloride and 10.6 g of 1-methoxy-2-propanol. The mixture is heated to 95° C. for 4.5 h.

After the reaction, 20.69 g of liquid polymer are obtained $^1$H-NMR and amine value measurement indicate quantitative conversion for quaternization.

Example A21

Synthesis of a Linear Polymer Poly(NCO-Ethylacrylate)

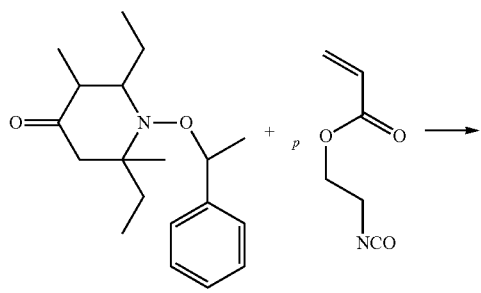

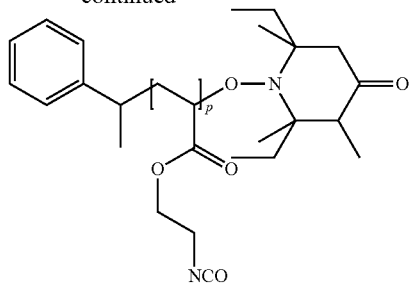

In a 3-necked 100 ml round bottom flask with magnetic stirring bar, cooler, thermometer, dropping funnel 20.0 g of Isocyanylethylacrylate (143.19 g/mol), 1.18 g compound O1 (317.48 g/mol) and 40 g of Butylacetate were added, three times degassed with N$_2$/vacuum and polymerized at 135° C. under N$_2$ until the conversion of around 48 mol %. Residual monomers and solvents were distilled of at 80° C. and 12 mbar.

Yield 96%, GPC (THF, PS-Standard, Mn=4926 g/mol, PD=1.09), liquid.

Example A22

Synthesis of a Comb Polymer Poly(NCO-Ethylacrylate-Co-Polysteracrylate)

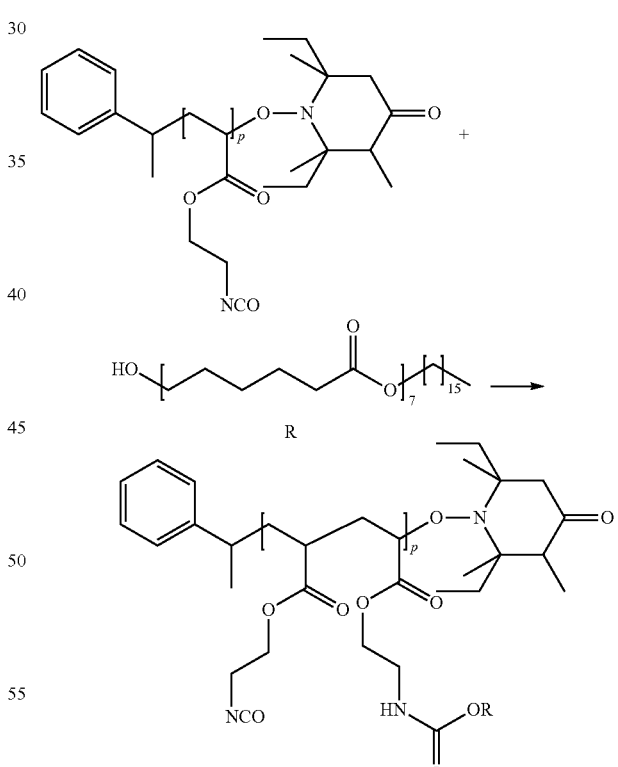

In a 3-necked 100 ml round bottom flask with magnetic stirring bar, cooler, thermometer, dropping funnel 10 g of a polymer A21 (42.08% n-Butylacetate), 13 g of polyester R and 1.26 g of Triethylamine were added. The mixture was stirred at 100° C. under N$_2$ for 3 hours. After the reaction, concentration under reduced pressure afforded 20 g of yellow oil.

The conversion was confirmed by $^1$H-NMR spectrum.

Example A23

Synthesis of a Comb Polymer Poly(Carbamateacrylate-Co-Polyesteracrylate)

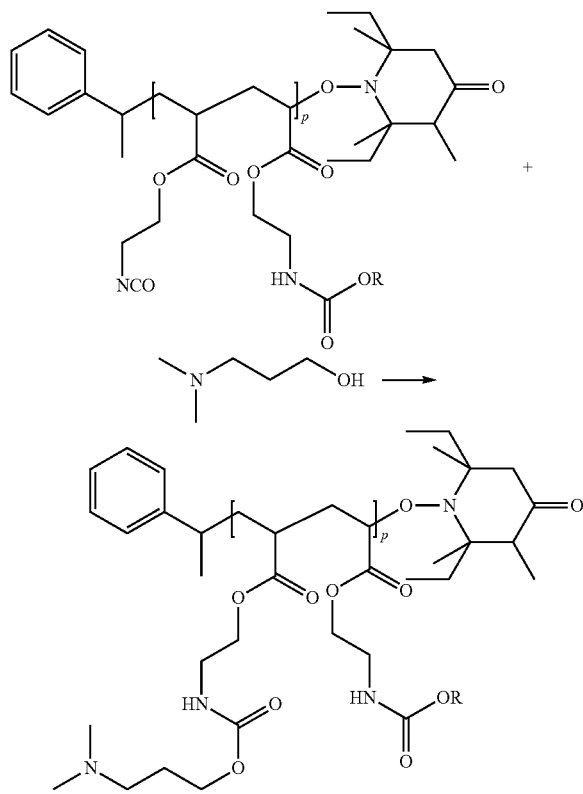

In a 3-necked 100 ml round bottom flask with magnetic stirring bar, cooler, thermometer, dropping funnel 20 g of a polymer A22, 2.58 g of N,N-dimethylaminopropanol and 20 g of n-Butylacetate were added. The mixture was stirred at 60-90° C. under $N_2$ for 3 hours.

After the reaction, concentration under reduced pressure afforded 17.61 g of yellow solid.

The conversion was confirmed by $^1$H-NMR spectrum.

Example A24

Synthesis of a Comb Polymer Poly(Carbamateacrylate-Co-Polyesteracrylate-Co-Quaternized Carbamateacrylate-Butylsulfonic Acid Anion))] by Quaternization)

MA is

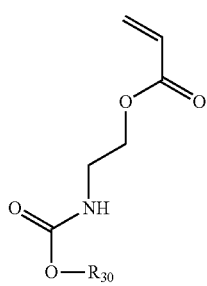

MB is

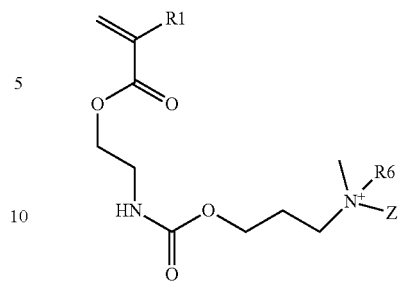

$R6=-CH_2-CH_2-CH_2-CH_2-SO_3^-$

In a 50 mL flask equipped with a magnetic stirring bar and distillation column are loaded 7.42 g of A23, 0.19 g of 1,4-Butanesulfone and 7.58 g of 1-methoxy-2-propanol. The mixture is heated to 95° C. for 6 h.

After the reaction, 15.19 g of liquid polymer are obtained
$^1$H-NMR and amine value measurement indicate quantitative conversion for quaternization.

Example A25

Synthesis of a Block Copolymer Poly[n-BA-b-(DMAEMA-Co-(Quaternized DMAEMA-Acetamide)-Cl$^-$-Co-(Quaternized DMAEMA-Polyoxyalkylenealkylether Polybasic Acid))] by Quaternization In a 25 mL flask equipped with a magnetic stirring bar and distillation column are loaded 1.2 g of Poly[n-BA-b-DMAEMA], 0.5 g of 2-Chloroacetamidel, 0.35 of polyoxyalkylenealkylether polybasic acid and 2 g of 1-methoxy-2-propanol. The mixture is heated to 110° C. for 4.5 h.

After the reaction, 4.05 g of liquid polymer are obtained.
$^1$H-NMR and amine value measurement indicate quantitative conversion for quaternization.

MA=BA and DMAEMA
MB=

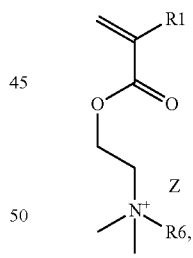

$R6=-CH_2-CO-NH2$, $Z=Cl^-$
MB=

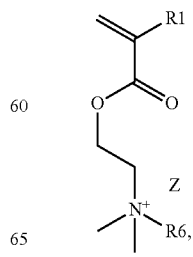

R6=polyoxyalkylenealkylether Z=polybasic acid
Suitable structure of new salt modified dispersants are
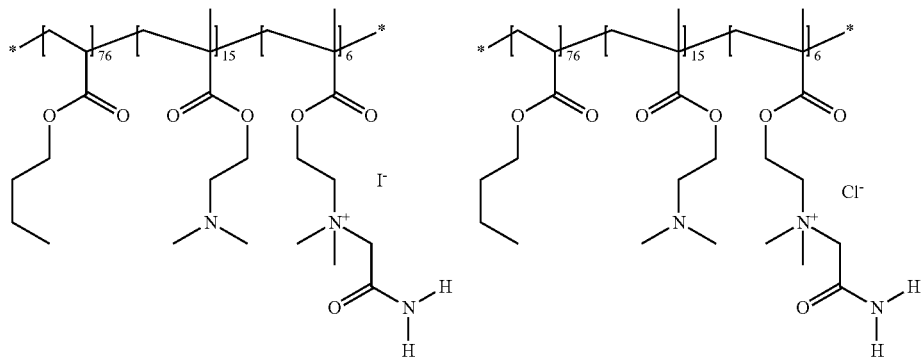
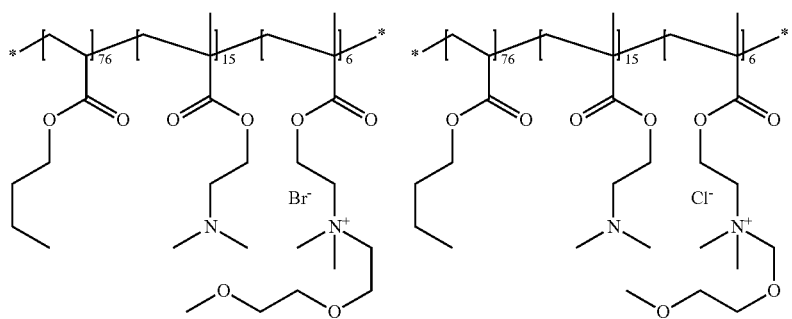
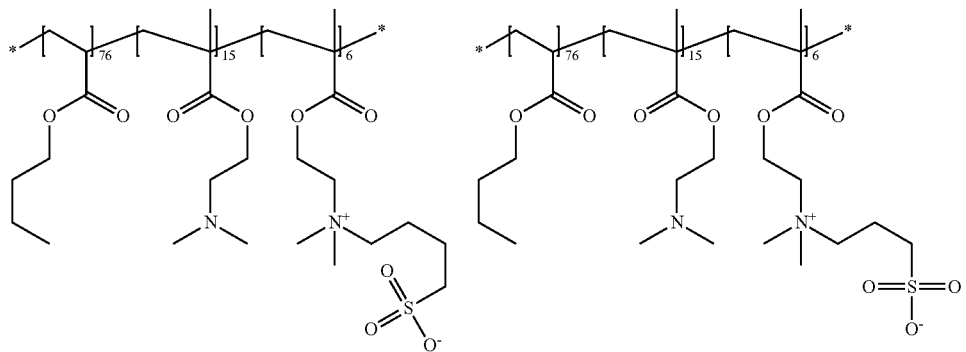
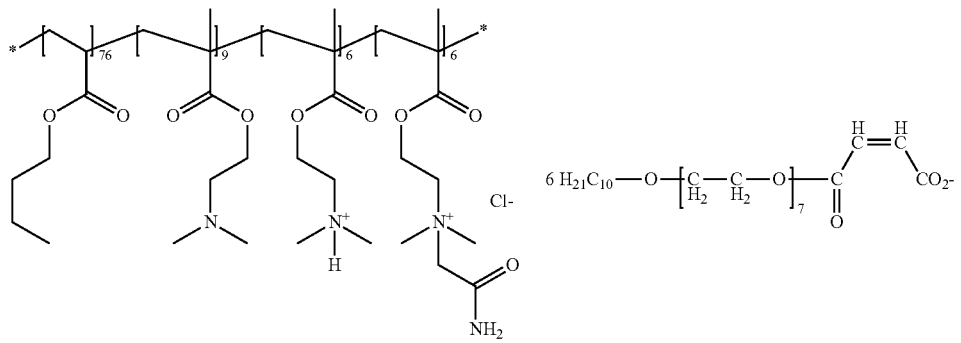

-continued
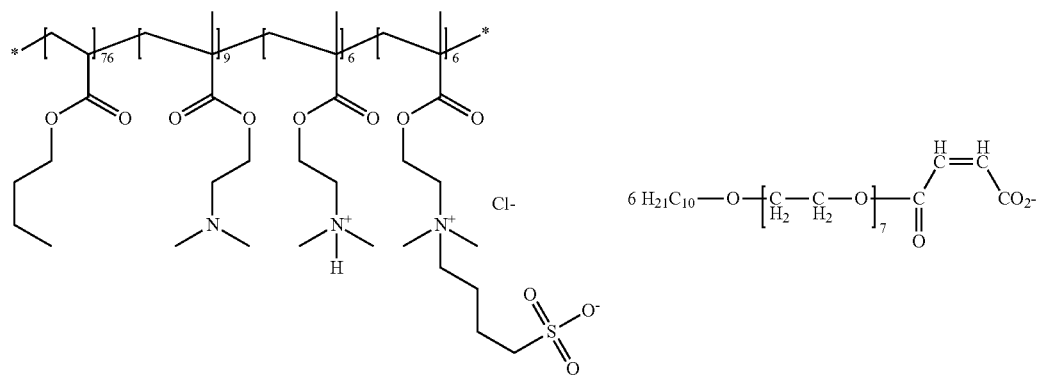
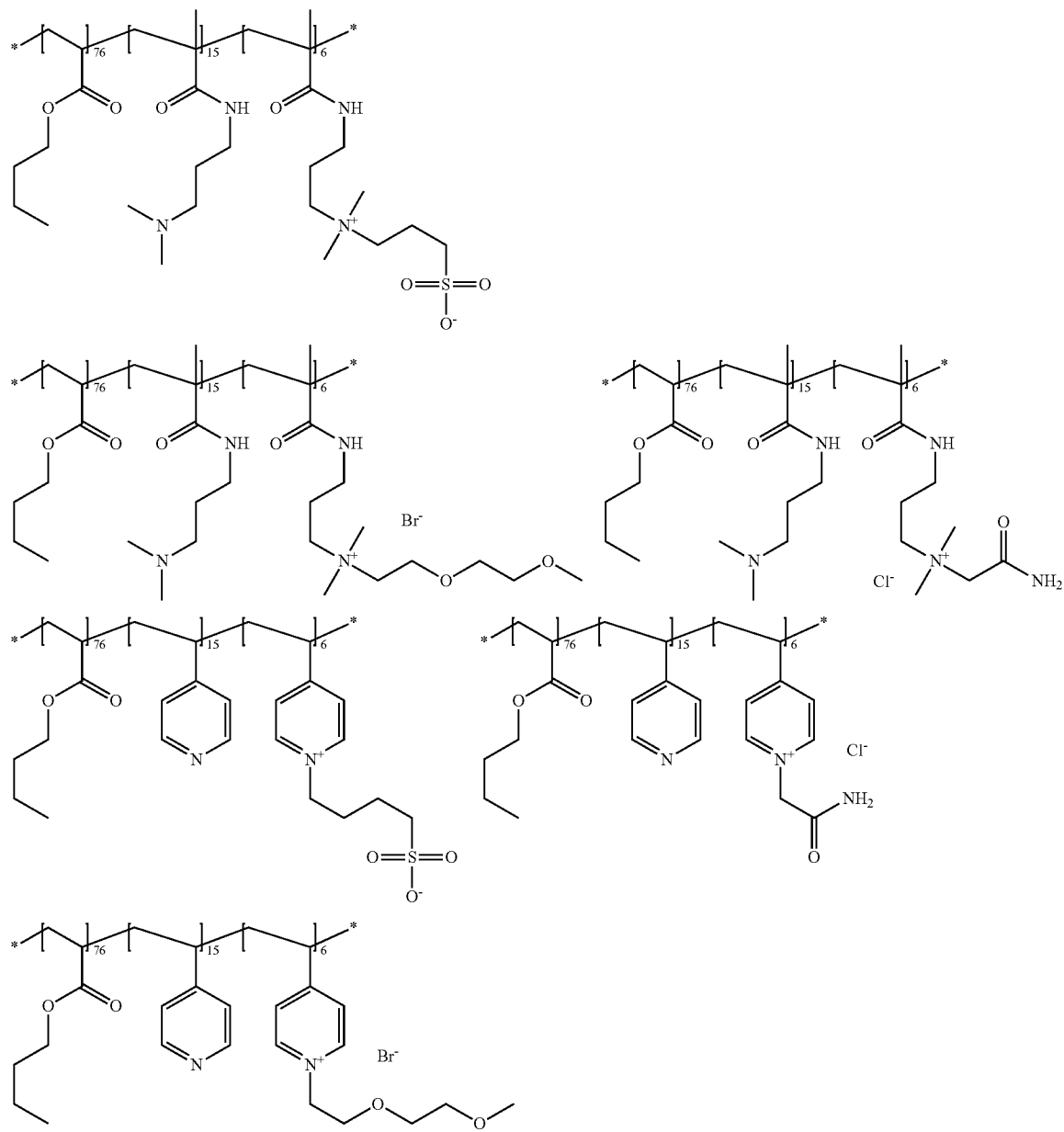

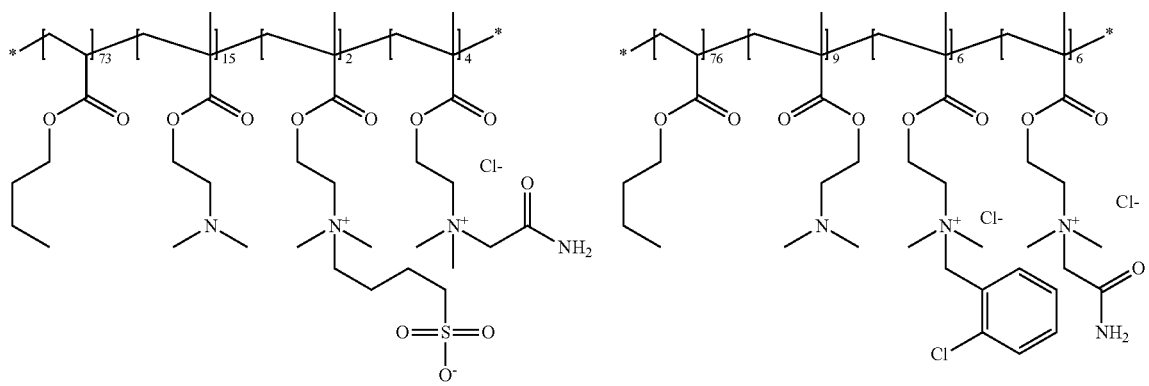
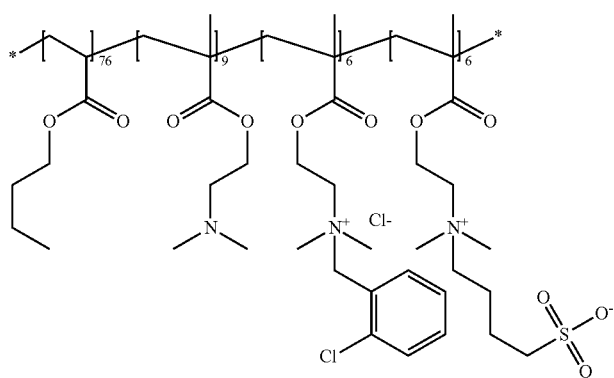
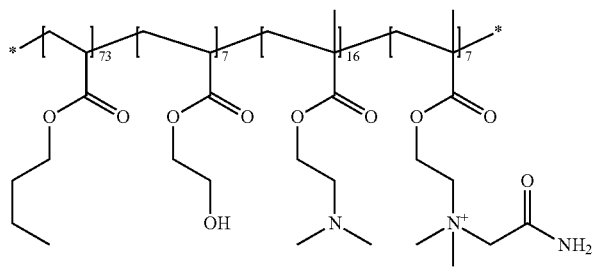
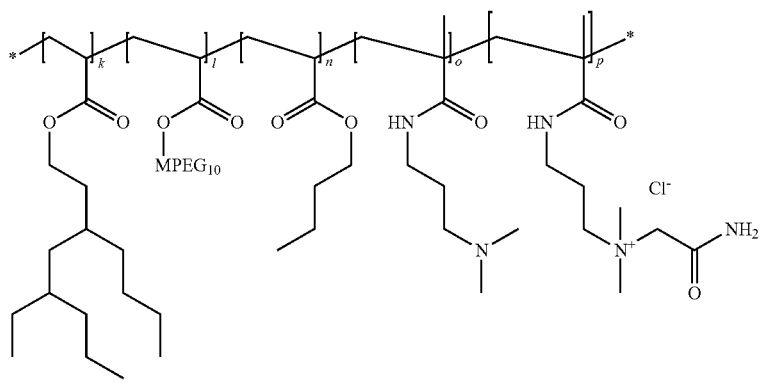

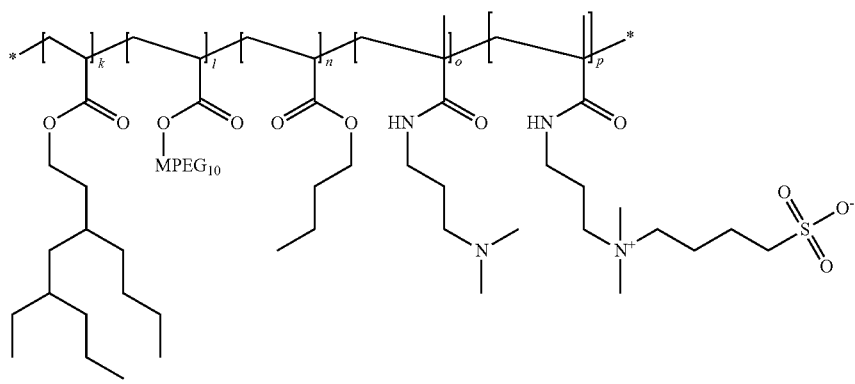

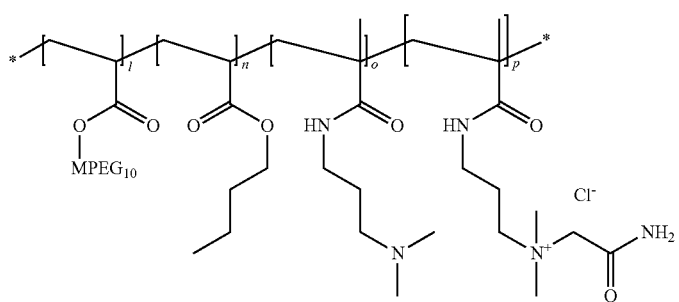

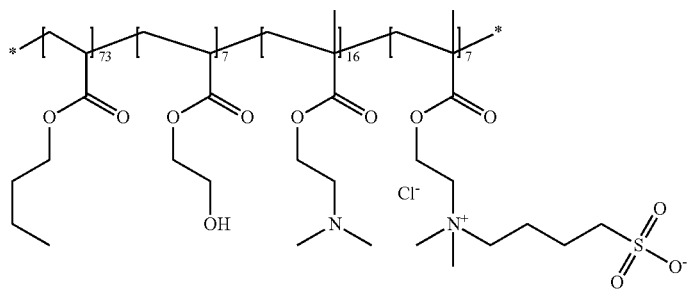

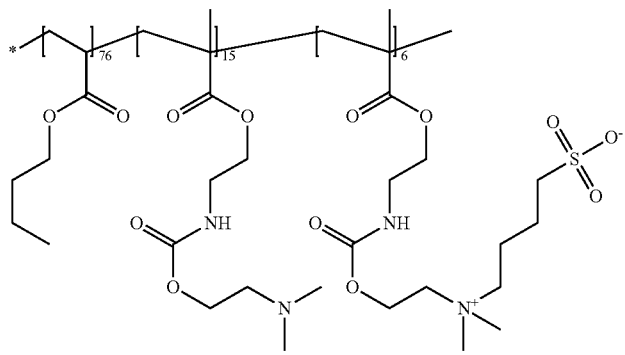

Preparation of Poly(Benzylmethacrylate-Co-Methacrylic Acid)—Binder:

24 g of benzyl-methacrylate, 6 g of methacrylic acid and 0.525 g of azobisisobutyronitrile (AIBN) are dissolved in 90 ml of propylene glycol 1-monomethyl ether 2-acetate (PG-MEA). The resulting reaction mixture is placed in a preheated oil bath at 80° C. After stirring for 5 hours at 80° C. under nitrogen, the resulting viscous solution is cooled to room temperature and used without further purification. The solid content is about 25%.

Preparation of Dispersion Films for Color Filter:

The following substances are placed into a 37 ml screw bottle:

for PB15:6 system

| | |
|---|---|
| 1.0 g | PB15:6 |
| 7.0 g | propylene glycol 1-monomethyl ether 2-acetate |
| 0.4 g | dispersant (solid) |
| 4.0 g | binder (25 wt % in PGMEA as mentioned above) |
| 0.08 g | Solsperse 5000 (Lubrizol) |
| 50.0 g | zircon beads |

Standard CF grade pigments used for the examples:
C.I. Pigment Blue 15:6: average of major axis 49 nm, minor axis 26 nm from TEM picture
Standard high molecular weight dispersants used for the examples:
Ciba EFKA-4046: Ciba SC
Disperbyk 2000, 2001: Altana—BYK Chemie The bottle is sealed with an inner cup and then applied to a paint conditioner for 3 hours to give the final dispersion. The dispersion thus obtained is cast onto a glass substrate by means of a spin coating, wherein a layer thickness is adjusted to give a film having a desired color points (by standard C light, observation 2 degree) by controlling rotation speed, then dried at 60° C. for 1 hour.

Optical properties of the dispersion films thus obtained are measured by use of a spectrophotometer (UV-2550PC, Shimadzu) and contrast measurement equipment (Model CT-1, Tsubosaka Electric Co., Ltd). The color points (C.I.E.1931x, y chromaticity diagram) are calculated using standard C light.

Viscosity measurements are performed by using a Brookfield Rheometer (Model DV-III ULTRA) with a cone/plate set-up at 25° C.

Developability of the dispersion films are measured by immersing into alkaline developer (Semi Clean DL-A4, Yokohama Oil & Fats Industry Co., LTD/water=10/90 vol %). Classify developability to 3 types. Dissolve, Dissolve then peel, Peel. Dissolve type is suitable for color filter application.

Measured immersing time until films completely disappeared from glass substance. In this formulation, 10-30 minutes indicated suitable level for color filter application.

TABLE 1

Performance data for a pigment system PB 15:6

| sample details | initial viscosity [mPa s] | | 1 week viscosity [mPa s] | | color property (y = 0.60) | | |
|---|---|---|---|---|---|---|---|
| | solids | | 60 | | | | |
| dispersant | [%] | 6 rpm | rpm | 6 rpm | 60 rpm | x | Y | contrast |
| BYK 2000 | 40 | 30 | 27 | 19 | 18 | 0.136 | 16.8 | 4700 |
| BYK 2001 | 46 | 14 | 13 | 12 | 12 | 0.136 | 17.1 | 4700 |
| EFKA 4046 | 40 | 16 | 16 | 25 | 23 | 0.136 | 17.2 | 4630 |
| A3 | 47 | 15 | 14 | 14 | 13 | 0.136 | 16.9 | 4600 |
| A4 | 51 | 21 | 20 | 20 | 18 | 0.136 | 17.2 | 4960 |
| A5 | 49 | 15 | 14 | 14 | 13 | 0.136 | 17.2 | 5140 |
| A6 | 50 | 15 | 14 | 13 | 13 | 0.136 | 17.2 | 5120 |
| A7 | 50 | 14 | 14 | 13 | 13 | 0.136 | 17.1 | 5020 |
| A8 | 45 | 15 | 15 | 14 | 14 | 0.136 | 17.1 | 5060 |
| A10 | 51 | 12 | 12 | 12 | 11 | 0.136 | 17.1 | 5310 |
| A12 | 50 | 14 | 13 | 12 | 12 | 0.136 | 17.2 | 5090 |
| A13 | 53 | 17 | 16 | 16 | 16 | 0.136 | 17.4 | 5200 |
| A14 | 48 | 13 | 14 | 13 | 13 | 0.136 | 17.1 | 5390 |
| A15 | 47 | 13 | 13 | 12 | 11 | 0.136 | 17.2 | 5320 |

TABLE 2

Developability data for a pigment system PB 15:6

| sample details | | developerbility | |
|---|---|---|---|
| dispersant | solids [%] | type | time [min] |
| BYK 2000 | 40 | Peel | 360 |
| BYK 2001 | 46 | Dissolve then peel | 120 |
| EFKA 4046 | 40 | Dissolve then peel | 60 |
| A3 | 53 | Dissolve then peel | 60 |
| A4 | 51 | Dissolve only | 20 |
| A5 | 49 | Dissolve only | 60 |
| A6 | 50 | Dissolve only | 60 |
| A7 | 50 | Dissolve only | 30 |
| A8 | 45 | Dissolve then peel | 30 |
| A10 | 51 | Dissolve only | 30 |
| A12 | 50 | Dissolve only | 40 |
| A13 | 53 | Dissolve only | 30 |
| A14 | 48 | Dissolve only | 30 |
| A15 | 47 | Dissolve only | 20 |

In this example, A4-A8, A10, A12-A15 related to this invention are compared to A3. Beside a good viscosity stability we see high Y value and high contrast ratio, which is an indication for an improved dispersion containing primary particles only. A complete de-agglomeration is achieved.

In addition, A4-A7, A10-A15, had the most suitable developability type 'Dissolve type' for color filter application. And also A4, A7, A8, A10, A13-A15 showed suitable development time.

The invention claimed is:

1. A copolymer made by nitroxide mediated controlled polymerisation comprising,
    at least one monomer ($MA_r$) selected from unsaturated monomers out of the group of acrylates, methacrylates, acrylamides, methacrylamides, styrenic monomers,
    at least one monomer ($MB_s$) selected from unsaturated monomers out of the group of acrylates, methacrylates, acrylamides, methacrylamides, styrenic monomers
        wherein the monomer MB has a quaternized N-atom structure with a polar substituent selected from polyether, polyamine, nitrile, amide, imine, imide, ester, ketone, nitrile, aldehyde, diketone, ketoester, ketoamide, carbonate, carbamate, carbamide, sulfoxide, sulfone, carboxylic acid, sulfonic acid, phosphoric acid groups; or carboxylic acid anion, sulfonic acid anion or phosphoric acid anion groups which is formed as betaine structure,
    wherein
    r denotes the total number of monomers MA within the structural element ($MA_r$) and r is >5;
    s denotes the total number of monomers MB within the structural element ($MB_s$) and s is >1,
    a fragment In of an initiator In-E capable to initiate radical polymerisation, and
    a group E bearing at least one stable free nitroxyl radical which is bound via the oxygen atom to the copolymer.

2. A copolymer according to claim 1, wherein MA-monomers are selected from $CH_2=CH-C(O)OR_2$, $CH_2=C(CH_3)-C(O)OR_2$, $CH_2=C(R_1)-C(O)OR_2 CH_2=CH-C(O)NR_4R_5$, $CH_2=C(CH_3)-C(O)NR_4R_5 CH_2=C(R_1)-C(O)NR_4R_5$ or $CH_2=C(R_{10})-Ar$,
    wherein
    $R_1$ is halogen or cyano or $R_1$ is $C_1$-$C_{18}$alkyl, $C_2$-$C_{18}$alkenyl, $C_3$-$C_{18}$cycloalkyl, $C_4$-$C_{18}$cycloalkenyl, $C_6$-$C_{24}$aryl, $C_1$-$C_{12}$alkyl-$C_6$-$C_{24}$aryl or $C_2$-$C_{12}$alkenyl-$C_6$-$C_{24}$aryl each of which optionally is substituted by one or more halogen or $OR_3$, $SR_3$ or $NR_4R_5$; and/or optionally is interrupted by one or more —O—, —S—, —$NR_4$—, $R_2$ is hydrogen; or $R_2$ is $C_1$-$C_{40}$alkyl, $C_2$-$C_{40}$alkenyl, $C_3$-$C_{40}$cycloalkyl, $C_4$-$C_{40}$cycloalkenyl, $C_6$-$C_{24}$aryl, $C_1$-$C_{20}$alkyl-$C_6$-$C_{24}$aryl or $C_2$-$C_{20}$alkenyl-$C_6$-$C_{24}$aryl each of which optionally is substituted by one or more halogen, $OR_3$, $SR_3$, $NR_4R_5$, NH—CO—$OR_{20}$ with R20 is —$C_2$-$C_6$alkylene-$NR_4R_5$ or is a polyester residue and/or optionally is interrupted by one or more —O—, —S—, —$NR_4$—, —C(O)—, —C(O)O—, —C(O)$NR_4$— or —OC(O)$NR_4$—

$R_3$ is hydrogen; or $R_3$ is $C_1$-$C_{20}$alkyl, $C_2$-$C_{20}$alkenyl, $C_3$-$C_{20}$cycloalkyl, $C_4$-$C_{20}$cycloalkenyl, $C_6$-$C_{24}$aryl, $C_1$-$C_{20}$alkyl-$C_6$-$C_{24}$aryl or $C_2$-$C_{20}$alkenyl-$C_6$-$C_{24}$ aryl each of which optionally is substituted by one or more halogen, $OC_1$-$C_{12}$alkyl, $SC_1$-$C_{12}$alkyl or $NR_4R_5$; and/or each of which is optionally interrupted by one or more —O—, —C(O)—, —C(O)O—, —S—, —$NR_4$—, $R_4$, $R_5$ independently of each other are hydrogen; or $R_4$, $R_5$ independently of each other are $C_1$-$C_{20}$alkyl, $C_2$-$C_{20}$alkenyl, $C_3$-$C_{20}$cycloalkyl, $C_4$-$C_{20}$cycloalkenyl, $C_6$-$C_{18}$aryl, $C_1$-$C_{20}$alkyl-$C_6$-$C_{24}$aryl or $C_2$-$C_{20}$alkenyl-$C_6$-$C_{24}$aryl each of which optionally is substituted by one or more halogen, $OR_3$, $SR_3$, $C(O)R_3$, $N(C_1$-$C_{12}$alkyl$)_2$; and/or optionally is interrupted by one or more —O—, —S—, —C(O)— or —$NC_1$-$C_{12}$alkyl; $R_4$ and $R_5$ can optionally form 5-, 6- or 7-membered rings with each other;

$R_{10}$ is hydrogen, halogen or cyano; or $R_{10}$ is $C_1$-$C_{18}$alkyl, $C_2$-$C_{18}$alkenyl, $C_3$-$C_{18}$cycloalkyl, $C_4$-$C_{18}$cycloalkenyl, $C_6$-$C_{24}$aryl, $C_1$-$C_{12}$alkyl-$C_6$-$C_{24}$aryl or $C_2$-$C_{12}$alkenyl-$C_6$-$C_{24}$aryl each of which optionally is substituted by one or more halogen or $OR_3$, $SR_3$ or $NR_4R_5$; and/or optionally is interrupted by one or more —O—, —S—, —$NR_4$—, Ar is pyridyl or imidazolyl, or $C_6$-$C_{24}$aryl which optionally is substituted by one or more halogen, $C_1$-$C_{20}$alkyl, $C_2$-$C_{20}$alkenyl, $OR_3$, $SR_3$, $NR_4R_5$, $C(O)R_3$, $C(O)OR_3$, $C(O)SR_3$ or $C(O)NR_4R_5$.

3. A copolymer according to claim 1, wherein MA-monomers are selected from $CH_2$=CH—$C(O)OR_2$, $CH_2$=C($CH_3$)—$C(O)OR_2$, $CH_2$=CH—$C(O)NR_4R_5$, $CH_2$=C($CH_3$)—$C(O)NR_4R_5$ or $CH_2$=CH—Ar wherein $R_2$, $R_4$, $R_5$ and Ar are as defined in claim 2.

4. A copolymer according to claim 3, wherein $R_2$ is linear or branched $C_1$-$C_{40}$alkyl, or $C_1$-$C_4$alkyl substituted by one or more halogen, OH, —N($C_1$-$C_{20}$alkyl$)_2$, —NH—CO—O—$C_2$-$C_6$alkylene-N($C_1$-$C_{20}$alkyl$)_2$, —NH—CO—O—$C_1$-$C_{40}$alkylene interrupted by one or more —O—, and Ar is phenyl, tolueneyl, pyridyl, imidazolyl.

5. A copolymer according to claim 1, wherein the monomer MB has the general formula $CH_2$=C($R_{11}$)—W—Y—Z wherein $R_{11}$ is hydrogen, halogen or cyano; or $R_1$ is $C_1$-$C_{18}$alkyl, $C_2$-$C_{18}$alkenyl, $C_3$-$C_{18}$cycloalkyl, $C_4$-$C_{18}$cycloalkenyl, $C_6$-$C_{24}$aryl, $C_1$-$C_{12}$alkyl-$C_6$-$C_{24}$aryl or $C_2$-$C_{12}$alkenyl-$C_6$-$C_{24}$aryl each of which optionally is substituted by one or more halogen or $OR_3$, $SR_3$ or $NR_4R_5$; and/or optionally is interrupted by one or more —O—, —S—, —$NR_4$—;

$R_3$ is hydrogen; or $R_3$ is $C_1$-$C_{20}$alkyl, $C_2$-$C_{20}$alkenyl, $C_3$-$C_{20}$cycloalkyl, $C_4$-$C_{20}$cycloalkenyl, $C_6$-$C_{24}$aryl, $C_1$-$C_{20}$alkyl-$C_6$-$C_{24}$aryl or $C_2$-$C_{20}$alkenyl-$C_6$-$C_{24}$ aryl each of which optionally is substituted by one or more halogen, $OC_1$-$C_{12}$alkyl, $SC_1$-$C_{12}$alkyl or $NR_4R_5$; and/or each of which is optionally interrupted by one or more —O—, —C(O)—, —C(O)O—, —S—, —$NR_4$—

$R_4$, $R_5$ independently of each other are hydrogen; or $R_4$, $R_5$ independently of each other are $C_1$-$C_{20}$alkyl, $C_2$-$C_{20}$alkenyl, $C_3$-$C_{20}$cycloalkyl, $C_4$-$C_{20}$cycloalkenyl, $C_6$-$C_{18}$aryl, $C_1$-$C_{20}$alkyl-$C_6$-$C_{24}$aryl or $C_2$-$C_{20}$alkenyl-$C_6$-$C_{24}$aryl each of which optionally is substituted by one or more halogen, $OR_3$, $SR_3$, $C(O)R_3$, $N(C_1$-$C_{12}$alkyl$)_2$; and/or optionally is interrupted by one or more —O—, —S—, —C(O)— or —$NC_1$-$C_{12}$alkyl; $R_4$ and $R_5$ can be optionally form 5-, 6- or 7-membered rings with each other and/or $R_3$ or $R_6$ W is direct bond or C(O)—X; or W is $C_1$-$C_{16}$alkylene, $C_1$-$C_{16}$alkenylene, $C_6$-$C_{18}$arylene, each of which optionally is interrupted by one or more —O—, —S—, —$NR_4$—, X is $OC_1$-$C_{16}$alkylene, $OC_1$-$C_{16}$alkenylene, —$OC_1$-$C_{16}$alkylene-NH—CO—$OC_1$-$C_{16}$alkylene —$SC_1$-$C_{16}$alkylene, —$SC_1$-$C_{16}$alkenylene, —$NR_4C_1$-$C_{16}$alkylene, —$NR_4C_1$-$C_{16}$alkenylene, —$OC_6$-$C_{18}$arylene, —$SC_6$-$C_{18}$arylene, —$NR_4C_6$-$C_{18}$arylene each of which optionally is interrupted by one or more —O—, —S—, —$NR_4$—, —$NR_4C(O)O$—, —$NR_4C(O)S$— or —$NR_4C(O)NR_4$—

Y is $C_2$-$C_{24}$cyclicammonium$^+$-$R_6$ or $N^+R_4R_5R_6$ $R_6$ is $C_1$-$C_{20}$alkyl, $C_1$-$C_{20}$alkenyl, $C_3$-$C_{20}$cycloalkyl, $C_4$-$C_{20}$cycloalkenyl, $C_6$-$C_{18}$aryl, $C_1$-$C_{20}$alkyl-$C_6$-$C_{24}$aryl or $C_2$-$C_{20}$alkenyl-$C_6$-$C_{24}$aryl each of which is substituted one or more than once by CN, $O[C_2$-$C_8$alkyleneO$]_mR_3$, $S[C_2$-$C_8$alkyleneO$]_mR_3$, $O[C_2$-$C_8$alkyleneS$]_mR_3$, $O[C_2$-$C_8$alkyleneN$]_mR_4R_5$, $NR_4R_5[C_2$-$C_8$alkyleneN$]_mR_4R_5$, $C(O)R_3$, $C(O)OR_3$, $C(O)SR_3$, $C(O)NR_4R_5$, $S(O)R_3$, $S(O)_2R_3$, $S(O)OR_3$, $S(O)_2NR_4R_5$, $OS(O)_2R_3$, $OS(O)_2OR_3$, $P(O)(OR_3)_2$, $OP(O)(OR_3)_2$, $OC(O)R_3$, $OC(O)OR_3$, $OC(O)SR_3$, $OC(O)NR_4R_5$, $SC(O)OR_3$, $SC(O)SR_3$, $SC(O)NR_4R_5$, $NR_4C(O)R_3$, $NR_4C(O)OR_3$, $NR_4C(O)SR_3$, $NR_4C(O)NR_4R_5$, $C(O)C(O)R_3$, $C(O)C(O)OR_3$, $C(O)C(O)SR_3$, $C(O)C(O)NR_4R_5$, $C(O)O^-$, $S(O)_2O^-$ or $P(O)OR_3O^-$, provided that if $R_6$ is $C_1$-$C_{20}$alkyl, $C_1$-$C_{20}$alkenyl, $C_3$-$C_{20}$cycloalkyl, $C_4$-$C_{20}$cycloalkenyl, $C_6$-$C_{18}$aryl, $C_1$-$C_{20}$alkyl-$C_6$-$C_{24}$aryl or $C_2$-$C_{20}$alkenyl-$C_6$-$C_{24}$aryl each of which is substituted by one or more $C(O)O^-$, $S(O)_2O^-$ or $P(O)OR_3O^-$, Z is not existing, Z is $PF_6^-$, $BF_4^-$, $OH^-$, $F^-$, $Cl^-$, $Br^-$ or $I^-$; or Z is $C_1$-$C_{40}$alkyl$[C(O)O^-]_n$, $C_1$-$C_{40}$alkenyl$[C(O)O^-]_n$, $C_3$-$C_{40}$cycloalkyl$C(O)O^-$, $C_4$-$C_{40}$cycloalkenyl$C(O)O^-$, $C_6$-$C_{24}$aryl$[C(O)O^-]_n$, $C_1$-$C_{40}$alkyl$[S(O)_2O^-]_n$, $C_1$-$C_{40}$alkenyl$[S(O)_2O^-]_n$, $C_3$-$C_{40}$cycloalkyl$S(O)_2O^-$, $C_4$-$C_{40}$cycloalkenyl$S(O)_2O^-$, $C_6$-$C_{24}$aryl$[S(O)_2O^-]_n$, $C_1$-$C_{40}$alkyl$[P(O)OR_3O^-]_n$, $C_1$-$C_{40}$alkenyl$[P(O)OR_3O^-]_n$, $C_3$-$C_{40}$cycloalkyl$P(O)OR_3O^-$, $C_3$-$C_{40}$cycloalkenyl$P(O)OR_3O^-$ or $C_6$-$C_{24}$aryl$[P(O)OR_3O^-]_n$ each of which optionally is interrupted by one or more —O—, —S—, —$NR_4$—, —C(O)—, —C(O)O—, —C(O)S—, —C(O)$NR_4$—, —OC(O)O—, —SC(O)O—, —SC(O)S—, —SC(O)$NR_4$—, —OC(O)$NR_4$— or —$NR_4C(O)NR_4$—;

m is >1, n is >1.

6. A copolymer according to claim 1, wherein the monomer MB has the general formula $CH_2$=CH—W—YZ or $CH_2$=C($CH_3$)—W—YZ wherein W is a direct bond or C(O)X and X is —$OC_1$-$C_{16}$alkylene or —$OC_1$-$C_{16}$alkylene-NH—CO—$OC_1$-$C_{16}$alkylene or is —$NHC_1$-$C_{16}$alkylene and Y and Z are as defined in claim 5.

7. A copolymer according to claim 1 wherein the monomer MB is selected from

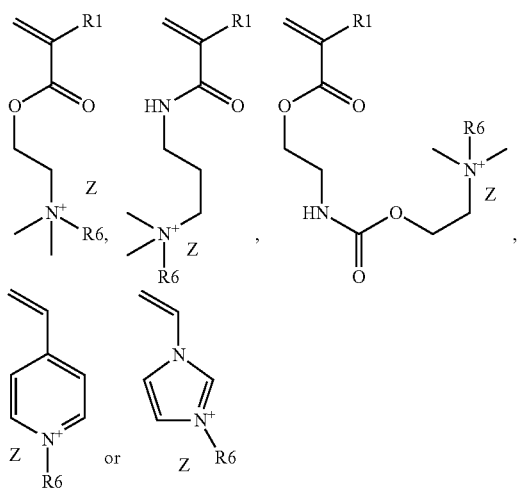

wherein $R_1$ is hydrogen or methyl and
$R_6$ is —$(CH_2)_{1-18}CN$, —$(CH_2)_{1-18}SO_3^-$, —$(CH_2)_{1-18}C(O)O^-$, —$CH_2$—$O[C_2$-$C_8alkyleneO]_mH$, —$CH_2C(O)CH_3$, —$CH_2CHO$, —$CH_2C(O)OC_1$-$C_{18}alkyl$, —$CH_2C(O)OH$, —$CH_2C(O)NH_2$, —$CH_2C(O)N(C_1$-$C_{18}alkyl)_2$, —$CH_2C(O)C(O)OC_1$-$C_{18}alkyl$, —$CH_2C(O)CH_2C(O)OC_1$-$C_{18}alkyl$, —$CH_2CH_2NHC(O)NH_2$, or

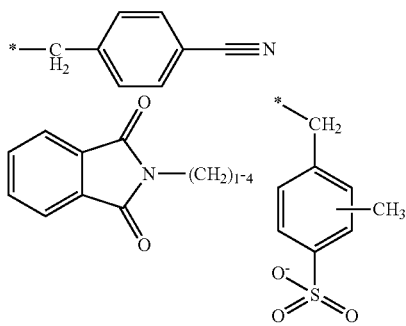

Z is Cl⁻, Br⁻ or I⁻; or Z is $C_1$-$C_{40}alkylC(O)O^-$, $C_1$-$C_{40}alkenylC(O)O^-$, $C_6$-$C_{10}arylC(O)O^-$, $C_1$-$C_{40}alkylS(O)_2O^-$, $C_1$-$C_{40}alkenylS(O)_2O^-$, $C_6$-$C_{10}arylS(O)_2O^-$, $C_1$-$C_{40}alkylP(O)OR_3O^-$ each of which optionally is interrupted by one or more —O—.

8. A copolymer $MA_r$-$MB_s$ according to claim 1 which comprises further monomers $MB'_{s'}$ of the general formula

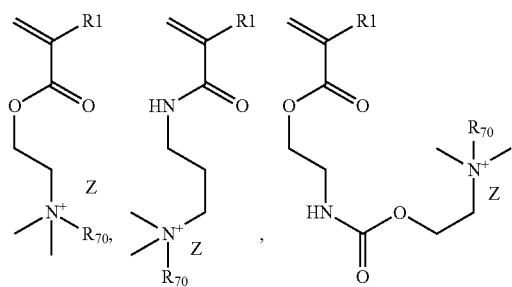

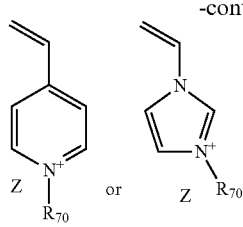

wherein $R_1$ is hydrogen or methyl and
$R_{70}$ is hydrogen, benzyl, o-chlorbenzyl, o,p-chlorbenzyl, 1-naphtyl, $C_1$-$C_4alkyl$, $C_1$-$C_4alkenyl$
Z is Cl⁻, Br⁻ or I⁻; or Z is $C_1$-$C_{40}alkylC(O)O^-$, $C_1$-$C_{40}alkenylC(O)O^-$, $C_6$-$C_{10}arylC(O)O^-$, $C_1$-$C_{40}alkylS(O)_2O^-$, $C_1$-$C_{40}alkenylS(O)_2O^-$, $C_6$-$C_{10}arylS(O)_2O^-$, $C_1$-$C_{40}alkylP(O)OR_3O^-$ each of which optionally is interrupted by one or more —O—.

9. A copolymer according to claim 1 made by nitroxide mediated controlled polymerization and having the general formula In-[($MA_r$-$MB_s$)-(E)z]t wherein
In is an initiator fragment capable to initiate radical polymerisation,
E is a group bearing at least one stable free nitroxyl radical, which is bound via the oxygen atom to the copolymer,
z=>1
t=1 to 20.

10. A copolymer according to claim 9 made by nitroxide mediated controlled polymerization and having the general formula In-($MA_r$-$MB_s$)-E wherein
In is an initiator fragment capable to initiate radical polymerisation,
E is a group bearing at least one stable free nitroxyl radical, which is bound via the oxygen atom to the copolymer.

11. A copolymer made by controlled polymerisation or by conventional polymerization comprising
at least one monomer ($MA_r$) selected from unsaturated monomers out of the group of acrylates, methacrylates, acrylamides, methacrylamides, styrenic monomers,
at least one monomer ($MB_s$) selected from unsaturated monomers out of the group of acrylates, methacrylates, acrylamides, methacrylamides, styrenic monomers wherein the monomer MB has a quaternized N-atom structure with a polar substituent selected from polyether, polyamine, nitrile, amide, imine, imide, ester, ketone, nitrile, aldehyde, diketone, ketoester, ketoamide, carbonate, carbamate, carbamide, sulfoxide, sulfone, carboxylic acid, sulfonic acid, phosphoric acid groups; or carboxylic acid anion, sulfonic acid anion or phosphoric acid anion groups which is formed as betaine structure,
wherein
r denotes the total number of monomers MA within the structural element ($MA_r$) and r is >5;
s denotes the total number of monomers MB within the structural element ($MB_s$) and s is >1.

12. A pigment dispersion in organic solvent dispersed by means of a copolymer of claim 1.

13. A coating composition comprising:
a) film forming binder,
b) pigment, c) optionally other conventional coating components and/or additives,
d) dispersant which is copolymer of claim 1, and
e) an organic solvent.

14. A composition comprising
a) photo resist binder,
b) transparent pigment,
c) optionally an organic solvent and/or optionally a photoinitiator or a photolatent catalyst,
d) dispersant which is copolymer of claim 1 for producing a color filter.

15. A copolymer according to claim 1 in preparation of paints, printing inks, inkjet inks, color resists and inkjet inks for color filters.

16. A copolymer according to claim 1 as a dispersant for pigments in an organic solvent.

17. The copolymer according to claim 5,
wherein
$m$ is 1-120; and
$n$ is 1-5.

18. The copolymer according to claim 17,
wherein
$m$ is 1-40; and
$n$ is 1-2.

19. The copolymer according to claim 1,
wherein
$r$ within the structural element $(MA_r)$ is 10-1000; and
$s$ within the structural element $(MB_s)$ is 2-100.

20. The copolymer according to claim 19,
wherein
$r$ within the structural element $(MA_r)$ is 10-500; and
$s$ within the structural element $(MB_s)$ is 2-50.

* * * * *